(12) United States Patent
Araki et al.

(10) Patent No.: US 11,358,481 B2
(45) Date of Patent: Jun. 14, 2022

(54) ENERGY CONSUMPTION PREDICTING DEVICE AND ENERGY CONSUMPTION PREDICTING METHOD

(71) Applicant: TOYOTA JIDOSHA KABUSHIKI KAISHA, Toyota (JP)

(72) Inventors: Yasushi Araki, Gotemba (JP); Masaaki Matsusue, Mishima (JP); Masayuki Ito, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/791,906

(22) Filed: Oct. 24, 2017

(65) Prior Publication Data

US 2018/0111503 A1   Apr. 26, 2018

(30) Foreign Application Priority Data

Oct. 26, 2016   (JP) .............................. JP2016-210033

(51) Int. Cl.
  *B60L 50/72*   (2019.01)

(52) U.S. Cl.
  CPC .......... *B60L 50/72* (2019.02); *B60L 2240/12* (2013.01); *B60L 2240/62* (2013.01); *B60L 2240/70* (2013.01); *B60L 2260/54* (2013.01); *Y02T 10/72* (2013.01); *Y02T 90/16* (2013.01); *Y02T 90/40* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 6,625,539 B1* | 9/2003 | Kittell | ....................... | B60L 3/12 |
| | | | | 701/29.3 |
| 9,841,463 B2* | 12/2017 | Brown | ....................... | G01L 5/13 |
| 2010/0025127 A1* | 2/2010 | Oyobe | ................... | B60K 15/04 |
| | | | | 180/65.22 |

(Continued)

FOREIGN PATENT DOCUMENTS

| | | |
|---|---|---|
| JP | 2000-292195 A | 10/2000 |
| JP | 2002-162235 A | 6/2002 |
| JP | 2009-128065 A | 6/2009 |

(Continued)

*Primary Examiner* — Russell Frejd
*Assistant Examiner* — Ana D Thomas
(74) *Attorney, Agent, or Firm* — Hunton Andrews Kurth LLP

(57) ABSTRACT

An energy consumption predicting device includes: an acquisition unit acquiring a parameter correlated with at least one of a vehicle speed when a vehicle traveled on a route from a first point to a second point on which a vehicle traveling using only a power source consuming an energy source supplied from outside of the vehicle and stored therein is able to travel, a different vehicle speed when a different vehicle traveled on the route, an output of the power source when the vehicle traveled on the route, and an output of a different power source when the different vehicle traveling using only the same type of different power source as the power source traveled on the route; and a calculation unit calculating a predicted consumption of the energy source which is predicted when the vehicle travels on the route from the first point to the second point.

5 Claims, 14 Drawing Sheets

(56) References Cited

U.S. PATENT DOCUMENTS

2011/0160993 A1  6/2011 Tsurutani et al.
2016/0159241 A1* 6/2016 Ueda .................... G09B 29/003
                                                   701/22

FOREIGN PATENT DOCUMENTS

| JP | 2009-174983 A | 8/2009 |
| JP | 2014-032139 A | 2/2014 |
| JP | 2014-157021 A | 8/2014 |
| WO | 2011080881 A1 | 7/2011 |
| WO | 2013073297 A1 | 5/2013 |
| WO | 2015011997 A1 | 1/2015 |

* cited by examiner

| POINT | AVERAGE VEHICLE SPEED | POINT | AVERAGE VEHICLE SPEED | POINT | AVERAGE VEHICLE SPEED |
|---|---|---|---|---|---|
| A1 | 35 | B1 | 43 | C1 | 65 |
| A2 | 38 | B2 | 45 | C2 | 67 |
| A3 | ⋮ | B3 | ⋮ | C3 | ⋮ |
| A4 | ⋮ | B4 | ⋮ | C4 | ⋮ |
| ⋮ | ⋮ | ⋮ | ⋮ | ⋮ | ⋮ |

| POINT | AVERAGE OUTPUT POWER | POINT | AVERAGE OUTPUT POWER | POINT | AVERAGE OUTPUT POWER |
|---|---|---|---|---|---|
| A1 | 24 | B1 | 38 | C1 | 42 |
| A2 | 26 | B2 | 39 | C2 | 45 |
| A3 | ⋮ | B3 | ⋮ | C3 | ⋮ |
| A4 | ⋮ | B4 | ⋮ | C4 | ⋮ |
| ⋮ | ⋮ | ⋮ | ⋮ | ⋮ | ⋮ |

| POINT | AVERAGE OUTPUT CURRENT | POINT | AVERAGE OUTPUT CURRENT | POINT | AVERAGE OUTPUT CURRENT |
|---|---|---|---|---|---|
| A1 | 3.6 | B1 | 5.2 | C1 | 6.5 |
| A2 | 3.8 | B2 | 5.7 | C2 | 7.0 |
| A3 | ⋮ | B3 | ⋮ | C3 | ⋮ |
| A4 | ⋮ | B4 | ⋮ | C4 | ⋮ |
| ⋮ | ⋮ | ⋮ | ⋮ | ⋮ | ⋮ |

ENERGY CONSUMPTION PREDICTING DEVICE AND ENERGY CONSUMPTION PREDICTING METHOD

INCORPORATION BY REFERENCE

The disclosure of Japanese Patent Application No. 2016-210033 filed on Oct. 26, 2016 including the specification, drawings and abstract is incorporated herein by reference in its entirety.

BACKGROUND

1. Technical Field

The present disclosure relates to an energy consumption predicting device and an energy consumption predicting method.

2. Description of Related Art

Japanese Patent Application Publication No. 2002-162235 (JP 2002-162235 A) discloses a technique of predicting fuel consumption when a vehicle travels on a route from a current location to a destination based on a legal speed limit or congestion information of the route, weather information, and the like.

SUMMARY

However, fuel consumption depends greatly on traveling conditions of a vehicle. Since how a vehicle travels actually on a route cannot be estimated from information such as a legal speed limit, congestion information, and weather information, there is a likelihood that fuel consumption will not be accurately predicted based on the information.

Therefore, the present disclosure provides an energy consumption predicting device and an energy consumption predicting method that accurately predict consumption of an energy source of a vehicle.

An energy consumption predicting device includes: an acquisition unit configured to acquire a parameter correlated with at least one of a vehicle speed when a vehicle traveled on a route from a first point to a second point on which a vehicle traveling using only a power source consuming an energy source supplied from outside of the vehicle and stored therein is able to travel, a different vehicle speed when a different vehicle traveled on the route, an output of the power source when the vehicle traveled on the route, and an output of a different power source when the different vehicle traveling using only the same type of different power source as the power source traveled on the route; and a calculation unit configured to calculate a predicted consumption of the energy source which is predicted when the vehicle travels on the route from the first point to the second point based on the parameter.

It is conceivable that a vehicle of which consumption of an energy source is to be predicted travels on a route in conditions similar to the vehicle speed of the vehicle, the different vehicle speed of the different vehicle, the output of the power source of the vehicle, or the output of the different power source of the different vehicle when the vehicle or the different vehicle actually traveled on the route. Accordingly, it is possible to accurately calculate a predicted consumption of an energy source based on the parameter correlated with such vehicle speeds or such outputs of the power sources.

The parameter may be correlated with one of the different vehicle speed and the output of the different power source.

The parameter may be correlated with at least one of the vehicle speed which is latest, the different vehicle speed which is latest, the output of the power source which is latest, and the output of the different power source which is latest.

The acquisition unit may acquire the parameter from a server which is disposed outside the vehicle by radio communication.

The calculation unit may calculate the predicted consumption based on a gradient of the route and the parameter correlated with at least one of the vehicle speed and the different vehicle speed.

The calculation unit may calculate the predicted consumption based on the output of the power source which is consumed by an air-conditioning device of the vehicle or consumption of the energy source.

The power source may be a fuel cell that consumes fuel gas as the energy source stored in a fuel tank.

An energy consumption predicting method includes: acquiring a parameter correlated with at least one of a vehicle speed when a vehicle traveled on a route from a first point to a second point on which the vehicle traveling using only a power source consuming an energy source supplied from outside of the vehicle and stored therein is able to travel, a different vehicle speed when a different vehicle traveled on the route, an output of the power source when the vehicle traveled on the route, and an output of a different power source when the different vehicle traveling using only the same type of different power source as the power source traveled on the route as an acquisition step; and calculating a predicted consumption of the energy source which is predicted when the vehicle travels on the route from the first point to the second point based on the parameter as a calculation step.

It is possible to provide an energy consumption predicting device and an energy consumption predicting method that accurately predict consumption of an energy source of a vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
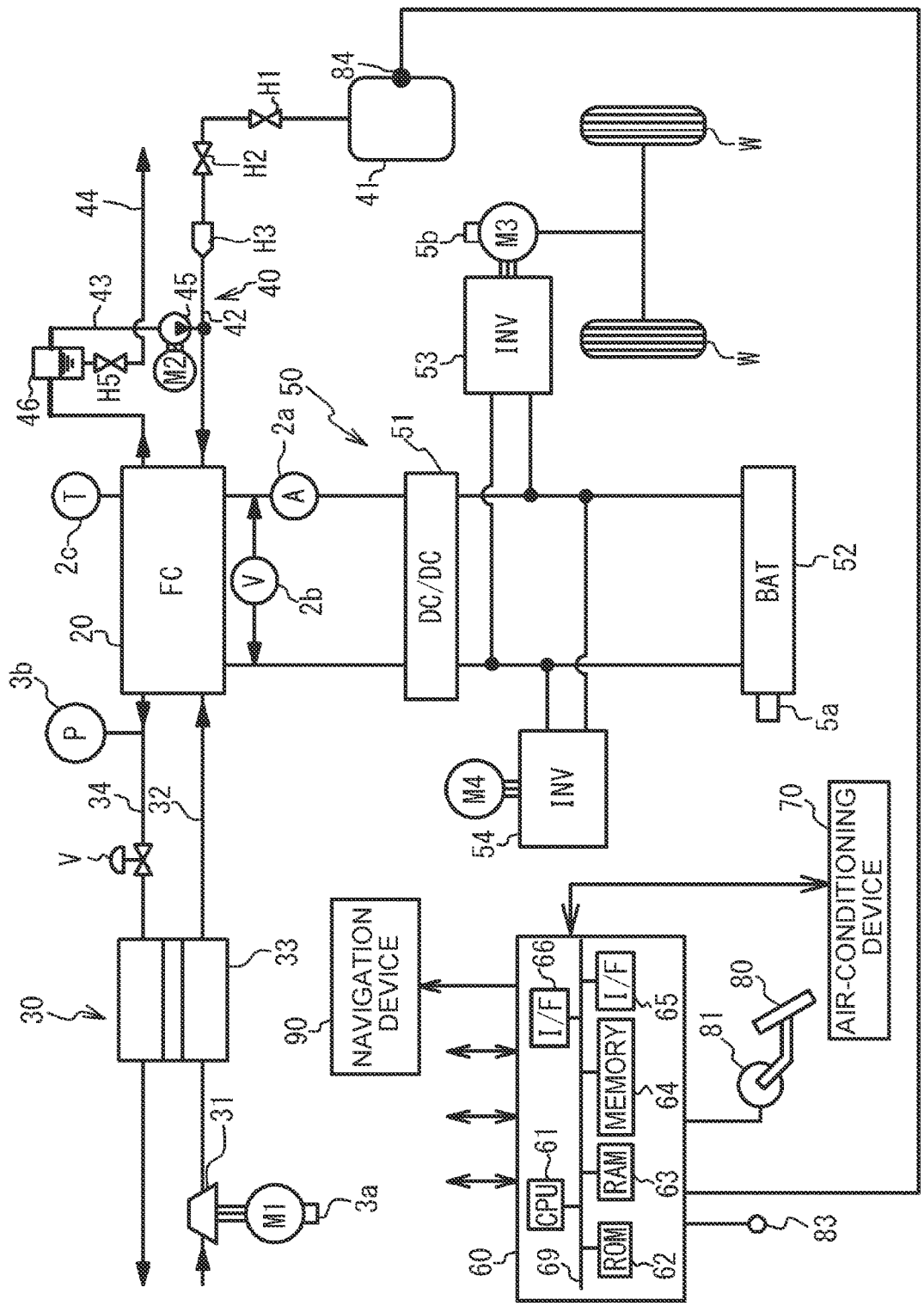
FIG. 1 is a diagram illustrating a configuration of a vehicle.

FIG. 1 is a diagram illustrating a configuration of a fuel-cell vehicle (hereinafter referred to as a vehicle). As illustrated in FIG. 1, the vehicle 1 includes a fuel cell 20, an oxidant gas piping system 30, a fuel gas piping system 40, a power system 50, and a control device 60. The fuel cell 20 is supplied with oxidant gas and fuel gas and generates power. The oxidant gas piping system 30 supplies air containing oxygen as the oxidant gas to the fuel cell 20. The fuel gas piping system 40 supplies hydrogen gas as fuel gas to the fuel cell 20. The power system 50 charges and discharges the power of a system. The control device 60 comprehensively controls the vehicle 1 as a whole. The fuel cell 20 is of a solid polymer electrolyte type and has a stacked structure in which a plurality of cells are stacked. A current sensor 2a and a voltage sensor 2b that detect an output current and an output voltage and a temperature sensor 2c that detects a temperature of the fuel cell 20 are attached to the fuel cell 20.

The oxidant gas piping system 30 includes an air compressor 31, an oxidant gas supply passage 32, a humidifier module 33, an oxidant off-gas passage 34, and a DC motor M1 that drives the air compressor 31. The air compressor 31 is driven by the motor M1, compresses air containing oxygen (oxidant gas) taken from outside air, and supplies the compressed air to a cathode of the fuel cell 20. A rotation speed sensor 3a that detects a rotation speed of the motor M1 is attached to the motor M1. The oxidant gas supply passage 32 guides air supplied from the air compressor 31 to the cathode of the fuel cell 20. Oxidant off-gas is discharged from the cathode of the fuel cell 20 via the oxidant off-gas passage 34. The humidifier module 33 appropriately humidifies oxidant gas which is supplied to the fuel cell 20. The oxidant off-gas passage 34 discharges the oxidant off-gas out of the system and a back-pressure control valve V is disposed in the vicinity of a cathode outlet. A pressure sensor 3b that detects a cathode back pressure is attached between the fuel cell 20 and the back-pressure control valve V in the oxidant off-gas passage 34.

The fuel gas piping system 40 includes a fuel tank 41, a fuel gas supply passage 42, a fuel gas circulation passage 43, an anode off-gas passage 44, a hydrogen circulation pump 45, a gas-liquid separator 46, and a motor M2 that drives the hydrogen circulation pump 45. The fuel tank 41 stores hydrogen gas as the fuel gas and supplies the hydrogen gas to the fuel cell 20. The fuel gas supply passage 42 guides fuel gas discharged from the fuel tank 41 to an anode of the fuel cell 20, and a tank valve H1, a hydrogen pressure control valve H2, and an injector H3 are sequentially arranged from an upstream side. The valves and the injector supply fuel gas to the fuel cell 20 or cut off the supply of fuel gas. The fuel gas circulation passage 43 returns unreacted fuel gas to the fuel cell 20, and the gas-liquid separator 46, the hydrogen circulation pump 45, and a check valve which is not illustrated are sequentially arranged from an upstream side. Unreacted fuel gas discharged from the fuel cell 20 is appropriately pressurized by the hydrogen circulation pump 45 and is guided to the fuel gas supply passage 42. An exhaust/drain valve H5 that discharges anode off-gas containing hydrogen off-gas discharged from the fuel cell 20 or water stored in the gas-liquid separator 46 out of the system is disposed in the anode off-gas passage 44.

The power system 50 includes a high-voltage DC/DC converter 51, a battery 52, a traction inverter 53, an auxiliary machinery inverter 54, a traction motor M3, and an auxiliary machinery motor M4. The high-voltage DC/DC converter 51 can adjust a DC voltage from the fuel cell 20 and output the adjusted DC voltage to the battery 52. An output voltage of the fuel cell 20 is controlled by the high-voltage DC/DC converter 51. The battery 52 is a secondary battery which is chargeable and dischargeable and can be charged with extra power or can supply auxiliary power. A part of DC power generated in the fuel cell 20 is stepped up/down by the high-voltage DC/DC converter 51 and charges the battery 52. An SOC sensor 5a that detects a state of charge of the battery 52 is attached to the battery 52. The traction inverter 53 and the auxiliary machinery inverter 54 convert DC power output from the fuel cell 20 or the battery 52 into three-phase AC power and supply the AC power to the traction motor M3 and the auxiliary machinery motor M4. The traction motor M3 drives wheels W of the vehicle. When the traction motor M3 performs regeneration, output power from the traction motor M3 is converted into DC power via the traction inverter 53 and charges the battery 52. A rotation speed sensor 5b that detects a rotation speed is attached to the traction motor M3.

As described above, the fuel cell 20 outputs electric power using oxidant gas and fuel gas as an energy source. Here, air which is the oxidant gas can be normally supplied from the outside to the fuel cell 20 without being stored in the vehicle 1. However, fuel gas is supplied to and stored in the fuel tank 41 from the outside and is supplied to the fuel cell 20. Accordingly, fuel gas is an example of an energy source which is supplied and stored from the outside of the vehicle, and the fuel cell 20 is an example of a power source that consumes the fuel gas. Accordingly, the vehicle 1 is an example of a vehicle that does not have an engine mounted therein and travels with the traction motor M3 as a drive source only using the fuel cell 20 that outputs electric power by consuming fuel gas supplied and stored from the outside of the vehicle 1.

An air-conditioning device 70 that cools and heats a vehicle interior is mounted in the vehicle 1. Details of the air-conditioning device 70 will be described later.

The control device 60 includes a central processing unit (CPU) 61, a read only memory (ROM) 62, a random access memory (RAM) 63, a memory 64, a network interface 65, and an input/output interface 66, which are connected to each other via a bus 69. The control device 60 comprehensively controls the units of the system based on various sensor signals which are input to the control device 60. Specifically, the CPU 61 of the control device 60 controls power generation of the fuel cell 20 based on sensor signals sent from an accelerator pedal sensor 81 that detects rotation of an accelerator pedal 80, a vehicle speed sensor 83, a remaining amount sensor 84 that detects an amount of fuel gas remaining in the fuel tank 41, an SOC sensor 5a, and a rotation speed sensor 5b via the input/output interface 66. The input/output interface 66 is connected to a navigation device 90 or an air-conditioning device 70. A storage unit of the navigation device 90 stores map data, previous traveling history of the vehicle 1, and the like. The navigation device 90 has a global positioning system (GPS) receiver that acquires positional information of the vehicle 1 therein. The CPU 61 of the control device 60 can wirelessly communicate with a server 100 via a network N which will be described later by the network interface 65.

The control device 60 can perform fuel consumption prediction control for predicting consumption of fuel gas by the fuel cell 20. This control is performed by an acquisition unit and a calculation unit which are functionally realized by the CPU 61, the ROM 62, the RAM 63, and the memory 64 of the control device 60. Accordingly, the control device 60 is an example of an energy consumption predicting device having the above-mentioned functions.

Figure 2:
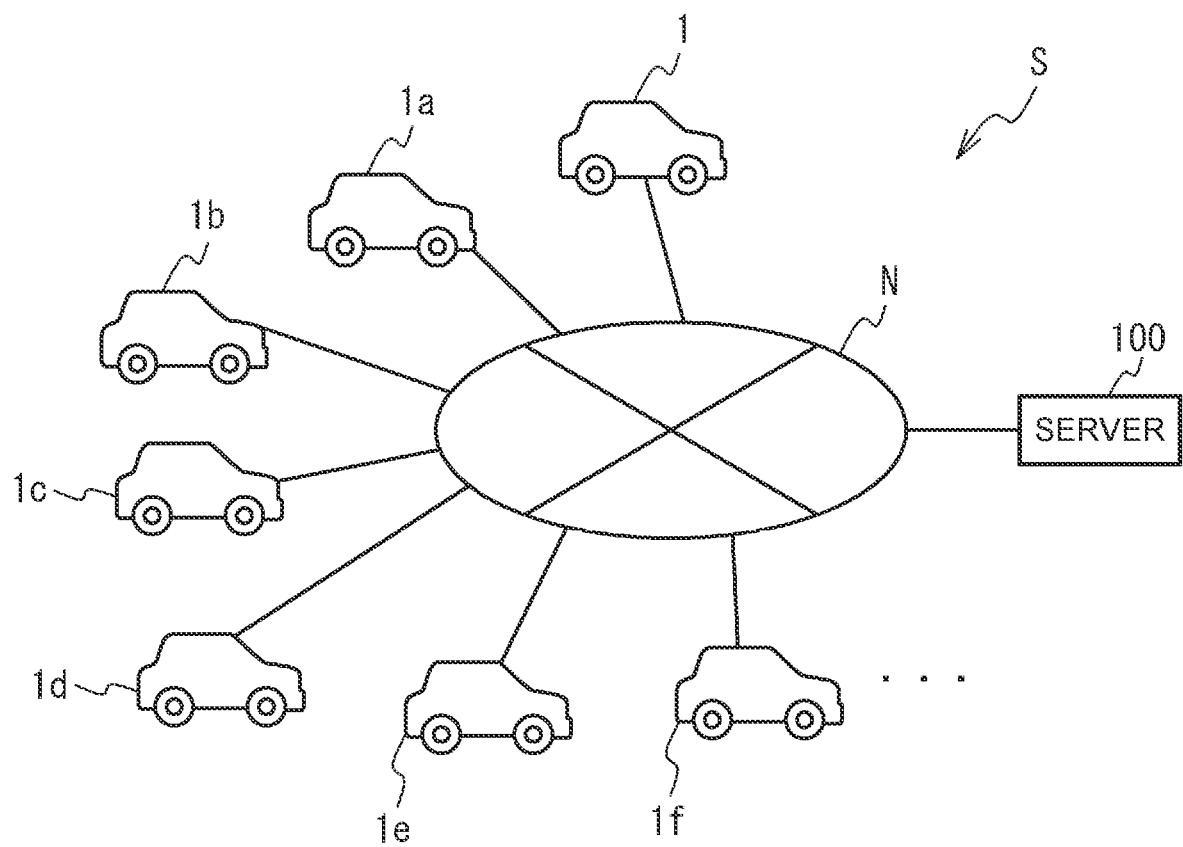
FIG. 2 is a diagram illustrating a configuration of an energy consumption predicting system S.

FIG. 2 is a diagram illustrating a configuration of an energy consumption predicting system S. In the energy consumption predicting system S, a vehicle group and a server 100 are connected to a network N such as the Internet. Specifically, control devices which are mounted in vehicles 1, 1a, 1b, 1c, 1d, 1e, 1f, . . . are connected to the network N. Here, the vehicles 1a to 1f other than the vehicle 1 are, for example, a vehicle group of engine vehicles, hybrid vehicles, electric vehicles, fuel-cell vehicles, and the like. Positional information and vehicle speeds of the vehicles 1 to 1f in correlation with each other are wirelessly transmitted to the server 100 from the control devices of the vehicles 1 to 1f via the network N.

Figures 3A, 3B:
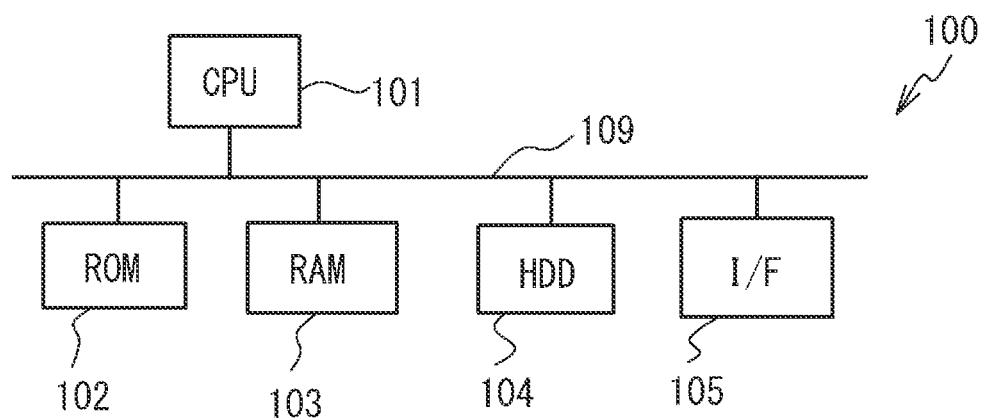
FIG. 3A is a diagram illustrating a configuration of a server.
FIG. 3B is a diagram illustrating an example of an average vehicle speed which is stored in an HDD of the server.

The server 100 will be described below. FIG. 3A is a diagram illustrating a configuration of the server 100. The server 100 includes a CPU 101, a ROM 102, a RAM 103, a hard disk drive (HDD) 104, and a network interface 105, which are connected to each other via a bus 109. In the server 100, various functions are embodied by causing the CPU 101 to execute programs stored in the ROM 102 or the HDD 104. The network interface 105 can communicate with the control device 60 of the vehicle 1 and can also communicate with the control devices of the vehicles 1a to 1f other than the vehicle 1. The HDD 104 stores positional information and vehicle speed information of the vehicles acquired from the vehicle group and an average vehicle speed at each point. So long as such information can be stored and held, the disclosure is not limited to the HDD 104 but may employ other storage devices. Here, an average vehicle speed is an average value of traveling speeds of the vehicle group when the vehicle group including the vehicles 1 to 1f travels at a point. FIG. 3B is a diagram illustrating an example of average vehicle speeds stored in the HDD 104. In FIG. 3B, an average vehicle speed is calculated for each of points A1, A2, A3, A4, . . . , B1, B2, B3, B4, . . . , C1, C2, C3, C4, . . . .

Figure 4A:
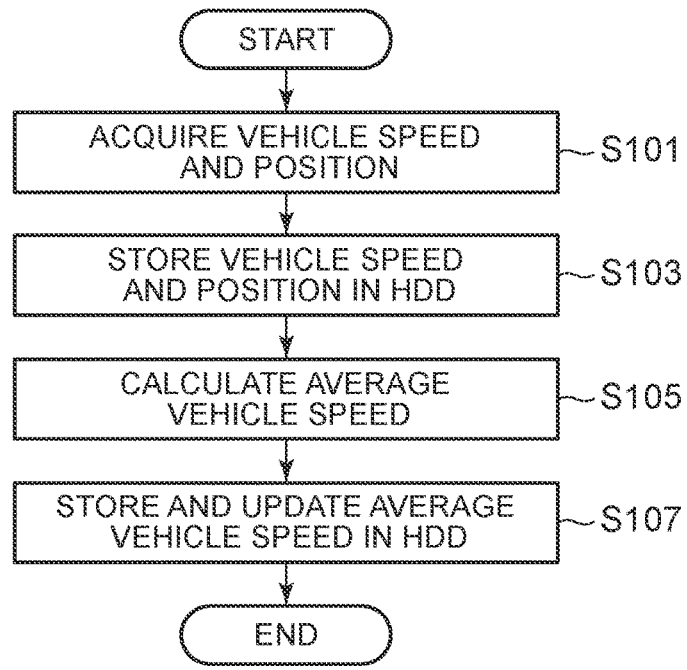
FIG. 4A is a flowchart illustrating an example of control for calculating an average vehicle speed.

Control for calculating an average vehicle speed which is performed by the server 100 will be described below. FIG. 4A is a flowchart illustrating an example of control for calculating an average vehicle speed which is performed by the server 100. This control is repeatedly performed at predetermined intervals. First, current locations of a plurality of vehicles and vehicle speeds at the points are acquired from the vehicles via the network N (Step S101). Current locations of vehicles are acquired, for example, based on positional information from GPS receivers mounted in the vehicles. The vehicle speeds of the vehicles are acquired based on information from vehicle speed sensors mounted in the vehicles. Then, the acquired locations and the acquired vehicle speeds are stored in the HDD 104 in correlation with each other (Step S103). Then, an average vehicle speed which is an average value of the vehicle speeds is calculated based on a plurality of vehicle speeds acquired for the same point (Step S105). The calculated average vehicle speed is stored in the HDD 104 in correlation with the corresponding point (Step S107). Accordingly, the average vehicle speed at each point reflects vehicle speeds of the vehicle 1 and other vehicles therein when the vehicle 1 has traveled through the point, and reflects vehicle speeds of other vehicles when the vehicle 1 has never traveled through the point.

Figure 4B:
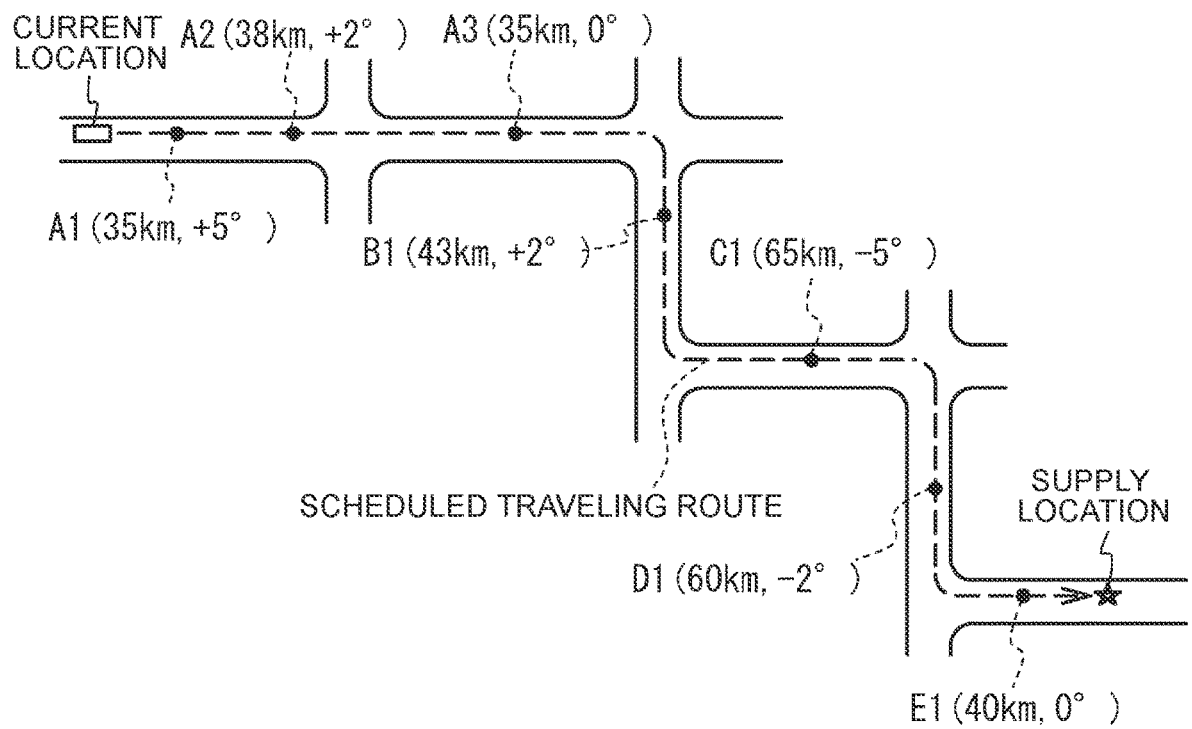
FIG. 4B is a conceptual diagram illustrating an average vehicle speed and a gradient at each point on a route.

Control which is performed by the control device 60 of the vehicle 1 will be described below. The control device 60 of the vehicle 1 acquires an average vehicle speed at each point on a route which is predicted when the vehicle 1 travels from a current location of the vehicle 1 to a supply location that can supply fuel gas as an energy source of the fuel cell 20 from the server 100. Here, the supply location is, for example, a location at which a hydrogen station that can supply hydrogen gas as fuel gas to the fuel tank 41 is located. The predicted route is a route for guiding the vehicle 1 in the navigation device 90 when the supply location is set as a destination in the navigation device 90. The control device 60 acquires the route from the navigation device 90. The control device 60 acquires an average vehicle speed at each point on the route from the server 100 and a road gradient at each point on the route from the map data stored in the navigation device 90. FIG. 4B is a conceptual diagram illustrating average vehicle speeds and gradients at points A1 to A3, B1, C1, D1, and E1 on the route. The control device 60 calculates a predicted consumption of fuel gas which is predicted to be consumed up to the supply location when the vehicle 1 travels on the route based on the average vehicle speed and the gradient at each point.

Figure 5:
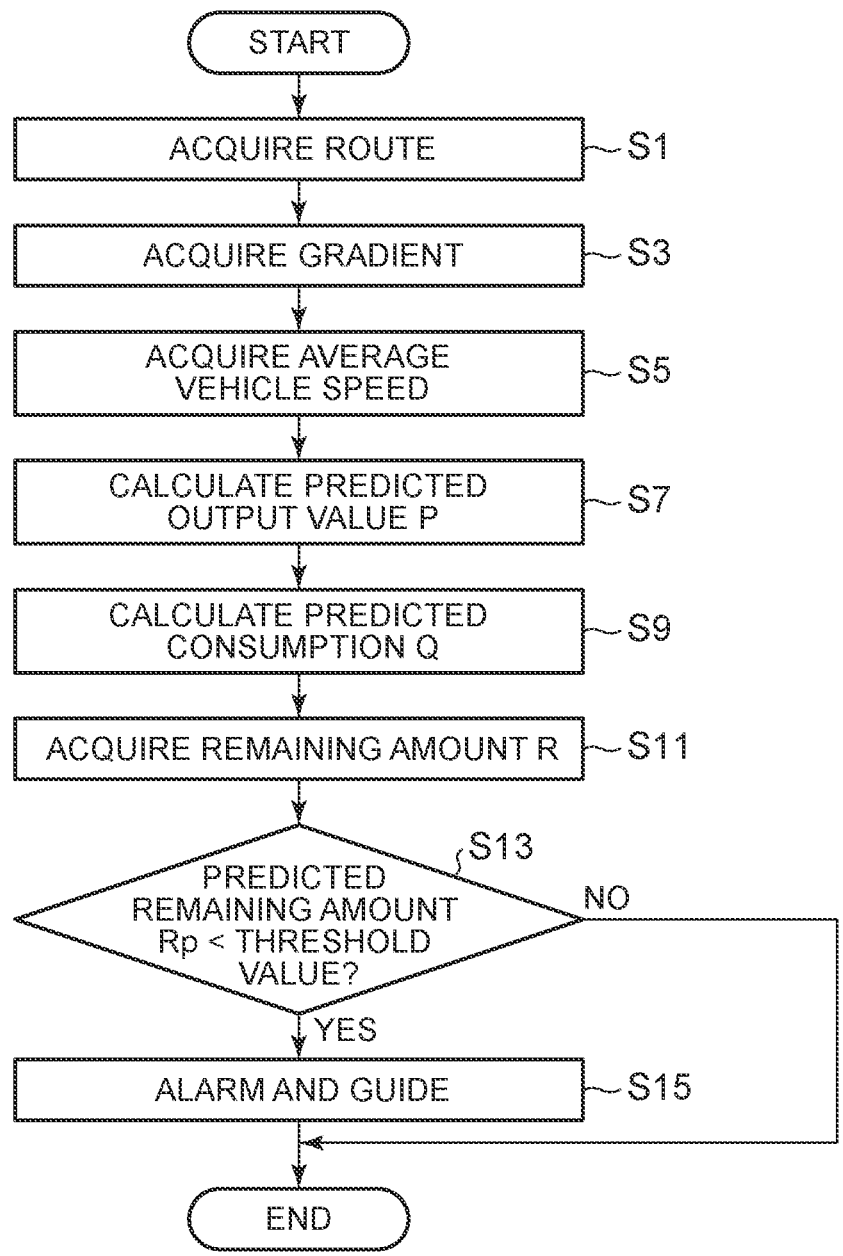
FIG. 5 is a flowchart illustrating an example of fuel consumption prediction control.

Fuel consumption prediction control which is performed by the control device 60 will be specifically described below. FIG. 5 is a flowchart illustrating an example of the fuel consumption prediction control. This control is repeatedly performed at predetermined intervals. First, as described above, a route is acquired from the navigation device 90 (Step S1). Then, a gradient at each point on the route is acquired from the map data of the navigation device 90 (Step S3). Then, an average vehicle speed at each point on the route is acquired from the server 100 (Step S5). As described above, the average vehicle speed reflects the vehicle speed at which the vehicle 1 traveled on the route in the past when the vehicle 1 has traveled on the route, and reflects vehicle speeds at which other vehicles traveled on the route in the past when the vehicle 1 has never traveled on the route. Accordingly, the average vehicle speed stored in the server 100 is an example of a parameter which is correlated with at least one of the vehicle speed when the vehicle 1 traveled on the route in the past and other vehicle speeds when other vehicles traveled on the route in the past. The process of Step S5 is an example of a process which is performed by an acquisition unit that acquires the parameter. The order of Steps S3 and S5 may be reversed.

Figure 6A:
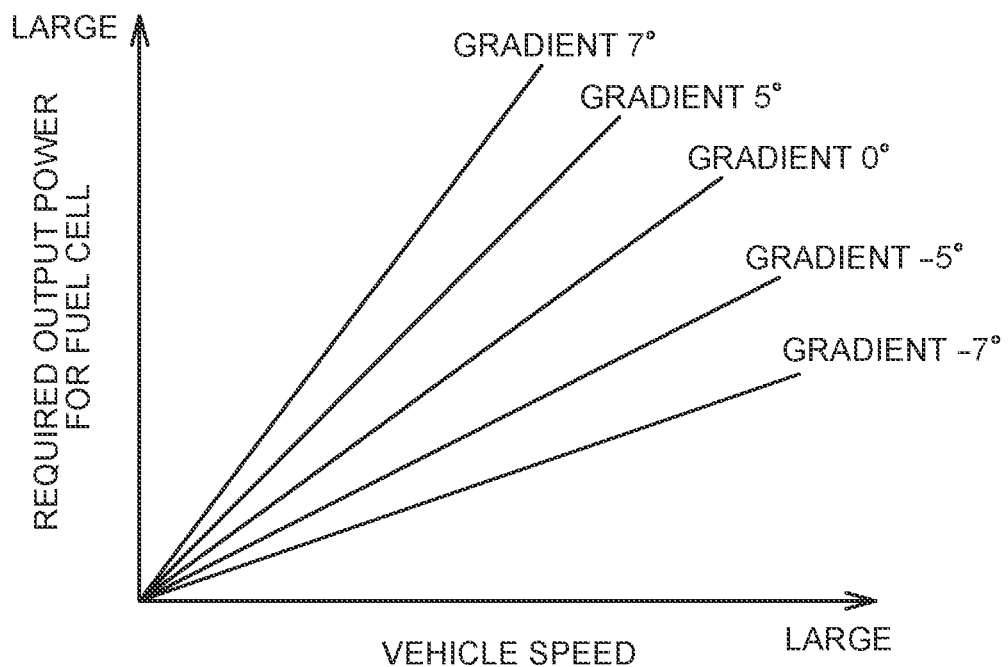
FIG. 6A is a map in which a required output power for a fuel cell with respect to a vehicle speed and a gradient is defined.

Then, a predicted output value P [kW] which is predicted to be output from the fuel cell 20 from a current location to the supply location is calculated based on the gradient and the average vehicle speed at each point on the route (Step S7). The predicted output value P of the fuel cell 20 can be regarded to be substantially the same as the required output power required for the fuel cell 20 to allow the vehicle 1 to travel through a predetermined point with a predetermined gradient at the average vehicle speed at that point. Specifically, the predicted output value P of the fuel cell 20 can be regarded to be substantially the same as a value of the power which is consumed by the traction motor M3, the auxiliary machinery motor M4, and the like and which is required for realizing the above-mentioned traveling. FIG. 6A is a map in which the required output power (kW) for the fuel cell 20 with respect to each vehicle speed and each gradient is defined. This map is calculated by experiment in advance and is stored in the memory 64 of the control device 60 in advance. The required output power for the fuel cell 20 increases as the vehicle speed increases, increases as an uphill gradient increases, and decreases as a downhill gradient increases. The predicted output value P of the fuel cell 20 at each point on the route is calculated with reference to the map.

Figure 6B:
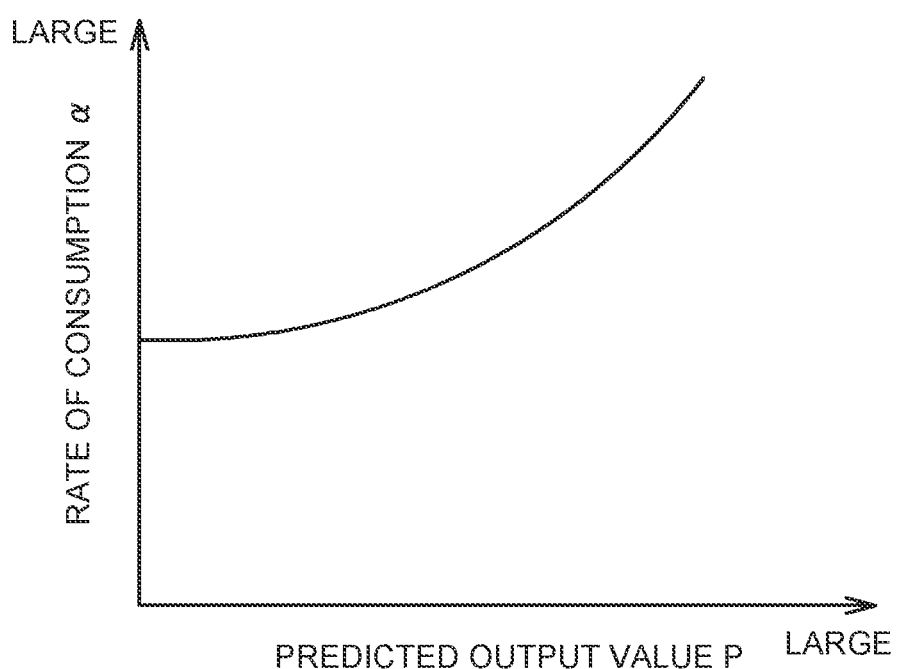
FIG. 6B is a map in which a rate of consumption of fuel gas with respect to a predicted output value is defined.
Figure 7A:
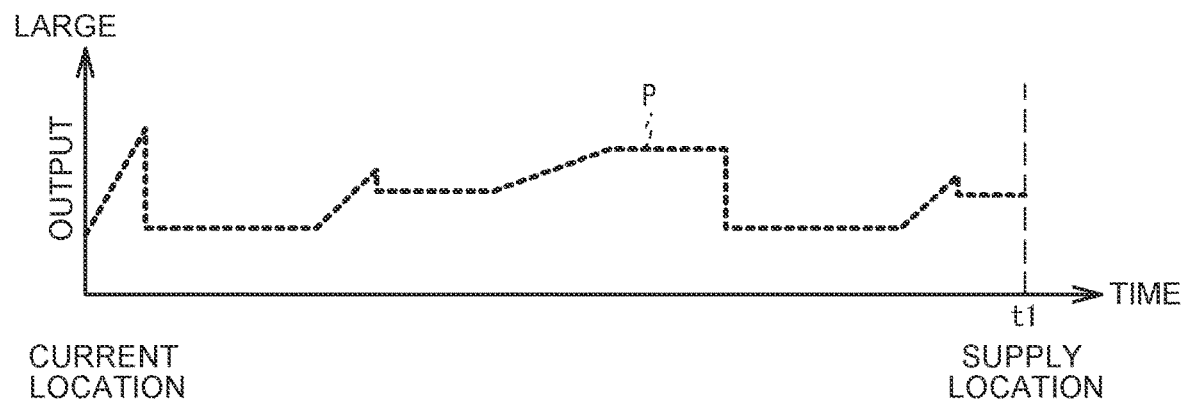
FIG. 7A is a graph illustrating an example of change of a predicted output value on a route from a current location to a supply location.
Figure 7B:
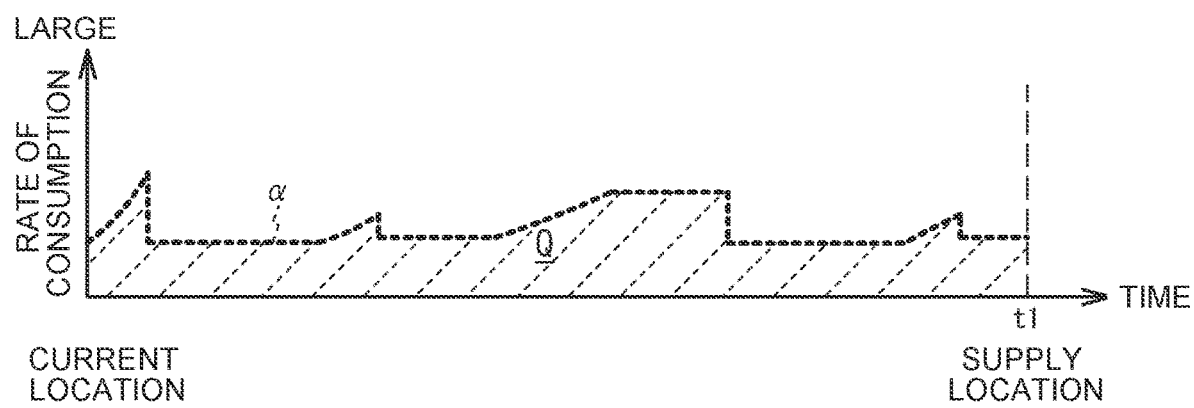
FIG. 7B is a graph illustrating an example of change of a rate of consumption of fuel gas on a route from a current location to a supply location.

Then, a predicted consumption of fuel gas Q [g] is calculated based on the calculated predicted output value P (Step S9). FIG. 6B is a map in which a rate of consumption of fuel gas α [g/sec] with respect to the predicted output value P is defined. This map is calculated by experiment in advance and is stored in the memory 64 of the control device 60 in advance. As the predicted output value P of the fuel cell 20 increases, the rate of consumption of fuel gas α increases and an increasing gradient of the rate of consumption α also increases. The reason for the increase in the increasing gradient of the rate of consumption α with an increase in the predicted output value P is that fuel efficiency deteriorates with an increase in the predicted output value P and a rate of increase of the rate of consumption α increases with respect to a rate of increase of the predicted output value P. FIGS. 7A and 7B are graphs illustrating examples of change of the predicted output value P and the rate of consumption of fuel gas a on the route from the current location to the supply location. The horizontal axis represents time. Time t0 denotes a current time which is a time at the current location and time t1 denotes a time at which the vehicle 1 is predicted to arrive at the supply location. In FIG. 7B, a time integral of the rate of consumption α from time t0 to time t1 corresponds to the predicted consumption Q. Since deterioration of fuel efficiency is reflected in the rate of consumption α as described above, it is possible to accurately calculate the predicted consumption Q. Time t1 is calculated based on a distance on a route from the current location to the supply location which can be acquired from the map data of the navigation device 90 and the average vehicle speed at each point on the acquired route.

Then, an amount of fuel gas remaining R [g] in the fuel tank 41 at the current time point is acquired based on a detected value of a remaining amount sensor 84 (Step S11). The process of Step S11 can be performed at any time before the process of Step S13 is performed. Then, it is determined whether a predicted remaining amount Rp which is a value obtained by subtracting the predicted consumption Q from the remaining amount R is less than a threshold value T (Step S13). The predicted remaining amount Rp is an amount of fuel gas remaining in the fuel tank 41 which is predicted at a time point at which the vehicle 1 arrives at the supply location after traveling on the route acquired in Step S1. The threshold value T is a positive value. When the determination result is negative, it is determined that it is not necessary to supply fuel gas at the current time point, and the control routine ends.

When the determination result is positive, a notification process of prompting an occupant to supply fuel gas is performed (Step S15). The notification process is a process of displaying an alarm message for prompting an occupant to supply fuel gas and the route, for example, on a display of the navigation device 90 or a display disposed in an instrument panel. In this way, the control device 60 gives an alarm for prompting an occupant to supply an energy source depending on a result of comparison of the predicted consumption Q with the amount of energy source remaining R.

As described above, the reason for calculating the predicted consumption Q of the vehicle 1 based on the average vehicle speed of a vehicle group having traveled on a route is that it is assumed that the vehicle 1 will travel on the route at a vehicle speed close to the average vehicle speed. Accordingly, the predicted output value P is accurately calculated based on the average vehicle speed. The predicted consumption Q is also accurately calculated based on the predicted output value P which has been accurately calculated and the rate of consumption α in which deterioration of the fuel efficiency has been reflected. Accordingly, it is possible to prevent a shortage of fuel gas, to set the threshold value T to be as small as possible, and to minimize an execution number of times of the notification process to prevent an occupant from feeling bothered.

As illustrated in FIGS. 4A and 4B, the server 100 updates the average vehicle speed to a newest average vehicle speed from time to time. Accordingly, a newest vehicle speed at each point is reflected in the average vehicle speed stored in the server 100, and it is possible to calculate the predicted consumption Q based on newest traffic conditions or the like by calculating the predicted consumption Q based on the latest average vehicle speed.

In the above-mentioned embodiment, the predicted output value of the fuel cell 20 is regarded to be substantially the same as the required output power required for the fuel cell 20 based on the gradients and the vehicle speeds, but the disclosure is not limited thereto. For example, based on output power of the battery 52 for complementing the output power of the fuel cell 20, a value obtained by subtracting a predetermined value corresponding to the complementing output power of the battery 52 from the required output power required for the fuel cell 20 based on the gradients and the vehicle speeds may be set as the predicted output value of the fuel cell 20. Based on the output power of the battery 52 for complementing the output power of the fuel cell 20, a value obtained by multiplying the predicted output value of the vehicle 1 by a predetermined coefficient k (0<k<1) may be set as the predicted output value of the fuel cell 20. The predicted output value may be calculated based on the temperature of the fuel cell 20 or the state of charge of the battery 52.

In the above-mentioned embodiment, the average vehicle speed acquired from the server 100 is used, but the average vehicle speed may be an average vehicle speed of a vehicle group into which all vehicles are classified with a predetermined criterion, instead of the average vehicle speed of all the vehicles which have traveled on the route. For example, an average vehicle speed of a vehicle group corresponding to the vehicle 1 among a vehicle group with a high number of times in which an acceleration is equal to or higher than a predetermined value in a section of a predetermined traveling distance and a vehicle group with a low number of times may be used. In this case, the server 100 classifies vehicles into the vehicle group with a high number of times in which an acceleration is equal to or higher than a predetermined value in a section of a predetermined traveling distance and the vehicle group with a low number of times based on the identification information and the accelerations transmitted from the vehicles 1 to 1f from time to time, and calculates and stores the average vehicle speeds of the vehicle groups in the HDD 104. The control device 60 of the vehicle 1 acquires the average vehicle speed of the vehicle group corresponding to the vehicle 1 from the HDD 104 with reference to the identification information of the vehicle 1 and the identification information stored in the HDD 104. Accordingly, it is possible to more accurately calculate the predicted consumption of fuel gas of the fuel cell 20 based on driving habits of a driver of the vehicle 1. Similarly, an average vehicle speed of a vehicle group corresponding to the vehicle 1 among average vehicle speeds of a vehicle group with a high number of times in which the vehicle speed is higher than a threshold value correlated with a speed limit at each point and a vehicle group with a low number of times may be used as the predicted vehicle speed of the vehicle 1. In this case, the server 100 classifies vehicles into the vehicle group with a high number of times in which the vehicle speed is higher than a threshold value correlated with a speed limit at each point and the vehicle group with a low number of times based on the identification information transmitted from the vehicles 1 to 1f and the difference between the vehicle speed at each point and the threshold value correlated with the speed limit, and calculates and stores the average vehicle speeds of the vehicle groups in the HDD 104. The control device 60 of the vehicle 1 acquires the average vehicle speed of the vehicle group corresponding to the vehicle 1 from the HDD 104 with reference to the identification information of the vehicle 1 and the identification information stored in the HDD 104. Examples of the identification information of the vehicle include a registered number shown on a number plate, a frame number, and a serial number of the fuel cell in case of a fuel-cell vehicle.

The latest average vehicle speed stored in the server 100 is used, but the disclosure is not limited thereto and, for example, a previous average vehicle speed may be used. As the previous average vehicle speed, for example, an average vehicle speed at the same time on a previous day may be used or an average vehicle speed on the same day of the last week may be used. Accordingly, it is possible to more accurately calculate the predicted consumption Q. In this case, the server 100 stores a position, a vehicle speed, and a date and time transmitted from each vehicle in correlation with each other in the HDD 104, calculates an average vehicle speed at each point for each date and time, and stores the calculated average vehicle speed in the HDD 104. That is, the average vehicle speed illustrated in FIG. 4B is stored in the HDD 104 for each date and time.

The predicted consumption Q may be calculated based on the average vehicle speeds stored in the server 100. For example, the predicted consumption Q may be calculated based on a value obtained by multiplying the average vehicle speed by a coefficient m (m>1) when a speed difference obtained by subtracting the average vehicle speed stored in the server 100 from the actual vehicle speed of the vehicle 1 in a predetermined traveling section is a positive value equal to or greater than a predetermined value, and the predicted consumption Q may be calculated based on a value obtained by multiplying the average vehicle speed by a coefficient l (0<l<1) when the speed difference has a negative value and the absolute value of the speed difference is equal to or greater than a predetermined value. Accordingly, it is possible to more accurately calculate the predicted consumption Q. In this case, the control device 60 may store the actual vehicle speed of the vehicle 1 in a predetermined traveling section. Alternatively, the control device 60 may transmit the actual vehicle speed of the vehicle 1 to the server 100 and the server 100 may calculate the predicted consumption Q based on the actual vehicle speed and the average vehicle speed and may transmit the calculated predicted consumption to the control device 60.

The rate of consumption α may be corrected to increase as the degree of output performance deterioration of the fuel cell 20 increases. For example, since the output performance of the fuel cell 20 decreases as a cumulative operation period or a cumulative traveling distance of the vehicle 1 increases, the rate of consumption α is corrected to increase as the cumulative operation period or the like increases. Accordingly, it is possible to more accurately calculate the predicted consumption Q. In this case, a map in which a coefficient for correcting the rate of consumption α is defined with respect to a parameter such as a cumulative operation period or a cumulative traveling distance may be stored in the memory 64 of the control device 60 in advance and the predicted consumption Q may be calculated by correcting the rate of consumption α with reference to the map.

The predicted consumption Q may be calculated using the vehicle speed when the vehicle 1 actually traveled on the route, which is stored in the server 100. This is because it can be assumed that the vehicle 1 travels at a vehicle speed close to the vehicle speed in this time and the predicted consumption Q can be accurately calculated. In this case, the server 100 stores the identification information, the position, and the vehicle speed of the vehicle 1 transmitted from the control device 60 of the vehicle 1 in the HDD 104 from time to time. The control device 60 of the vehicle 1 acquires the vehicle speed of the vehicle 1 on the route from the HDD 104.

When an average vehicle speed at a certain point on the route which is stored in the server 100 is based on only a vehicle speed of a single vehicle, the predicted consumption Q is calculated based on the vehicle speed of the single vehicle. In this case, the vehicle speed stored in the server 100 may be a vehicle speed when the vehicle 1 traveled on the route or may be a vehicle speed when a different vehicle traveled on the route.

In the above-mentioned embodiment, the rate of consumption α is calculated based on the predicted output value P calculated from the average vehicle speed and the gradient, but the predicted consumption Q may be directly calculated from the average vehicle speed and the gradient without calculating the predicted output value P. In this case, a map in which the rate of consumption α corresponding to the average vehicle speed and the gradient is defined is stored in the memory 64 of the control device 60 in advance and the predicted consumption Q is calculated with reference to the map.

The control illustrated in FIG. 5 may be performed in cooperation by the control device 60 and the server 100. For example, the control device 60 may perform the processes of steps S1, S3, S11, S13, and S15 and the server 100 may perform the processes of Steps S5 to S9. In this case, the server 100 acquires the route and the gradient from the control device 60, acquires the average vehicle speed at each point on the route from the HDD 104, and calculates the predicted consumption Q based on the acquired information. Accordingly, the server 100 is an example of the energy consumption predicting device having functions of an acquisition unit and a calculation unit. The maps illustrated in FIGS. 6A and 6B are stored in advance in the HDD 104 to allow the server 100 to perform the processes of Steps S7 and S9. The server 100 may perform the processes of Steps S1 to S13 and the control device 60 may perform the process of Step S15. In this case, the server 100 may acquire the route from the navigation device 90 of the vehicle 1 or the server 100 may calculate and acquire a route from a current location of the vehicle 1 to a nearest supply location. The server 100 may acquire a gradient from the navigation device 90 of the vehicle 1 or may acquire a gradient from map data stored in the server 100. The server 100 acquires a remaining amount R from the control device 60 from time to time.

Figure 8A:
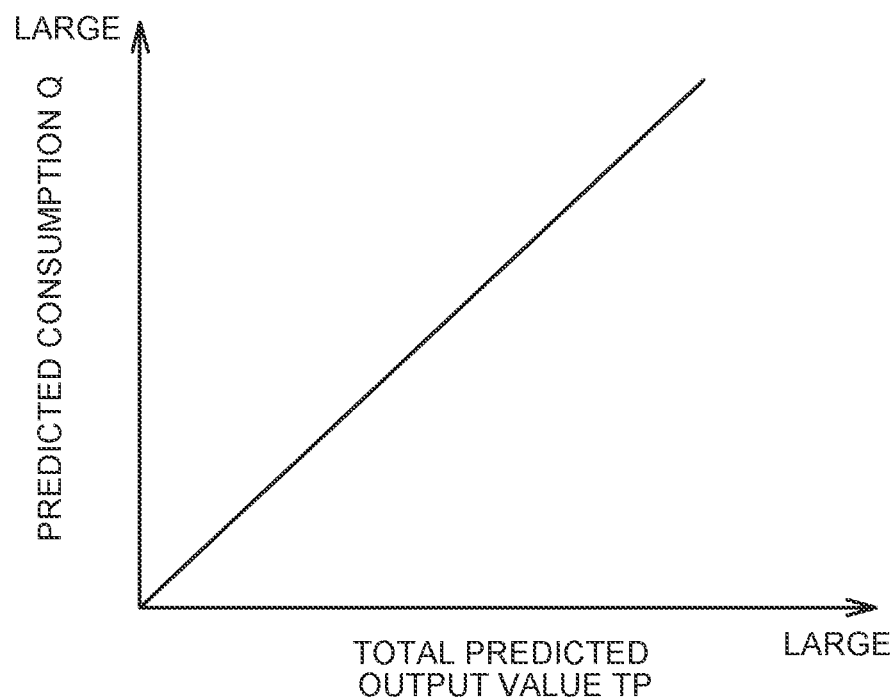
FIG. 8A is a map in which a predicted consumption of fuel gas with respect to a total predicted output value is defined.

A plurality of modified examples will be described below. First, a first modified example will be described. In the first modified example, the predicted consumption Q is calculated based on a total predicted output value TP which is a sum of the predicted output values P from the current location to a supply location. The total predicted output value TP is calculated by integrating the predicted output value P with respect to time from a current time point to a time point at which the vehicle arrives at the supply location. FIG. 8A is a map in which the predicted consumption Q of fuel gas with respect to the total predicted output value TP is defined. As the total predicted output value TP increases, the predicted consumption Q increases linearly. This map is stored in the memory 64 of the control device 60 in advance. In comparison with the above-mentioned embodiment, it is possible to easily calculate the predicted consumption Q without calculating the rate of consumption α at each point and thus to reduce a processing load of the control device 60.

Figure 8B:
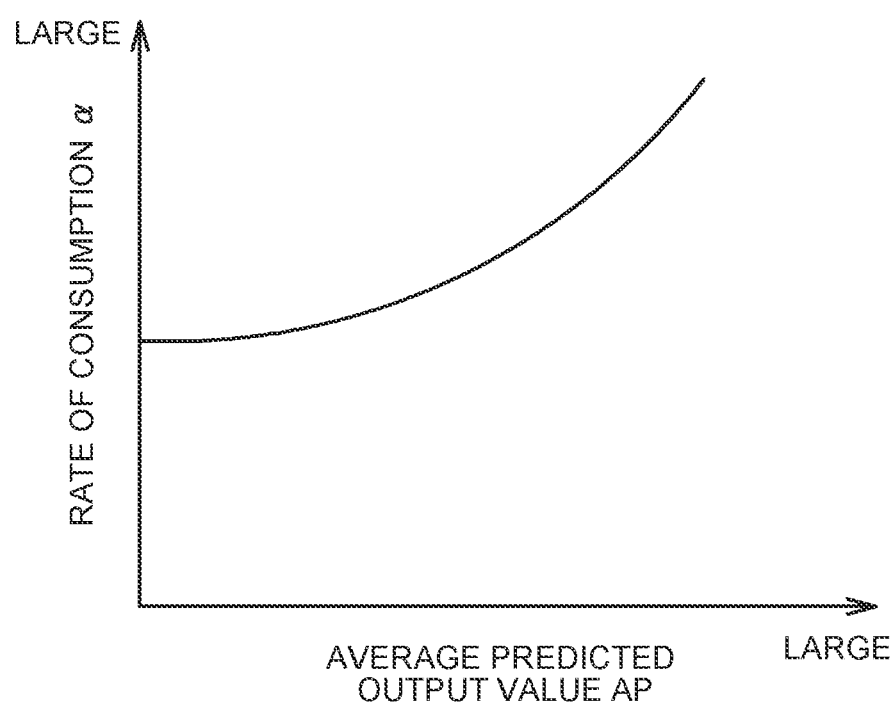
FIG. 8B is a map in which a rate of consumption α of fuel gas with respect to an average predicted output value is defined.

A second modified example will be described below. In the second modified example, the rate of consumption α of fuel gas is calculated based on an average predicted output value AP which is an average of the predicted output values p from a current location to a supply location, and the predicted consumption Q is calculated based on the rate of consumption α. The average predicted output value AP is calculated by dividing the total predicted output value TP by a period from a current time point to a time point at which the vehicle is predicted to arrive at the supply location. FIG. 8B is a map in which the rate of consumption α of fuel gas with respect to the average predicted output value AP is defined. The map illustrated in FIG. 8B, similarly to FIG. 6B, reflects that the rate of consumption α increases and the increasing gradient of the rate of consumption α increases as the average predicted output value AP increases, and fuel efficiency deteriorates more as the average predicted output value AP increases. This map is stored in the memory 64 of the control device 60 in advance. By multiplying the calculated rate of consumption α by a period [sec] from the current time point to the time point at which the vehicle 1 is predicted to arrive at the supply location, the predicted consumption Q is accurately calculated based on the deterioration in fuel efficiency.

A third modified example will be described below. In the third modified example, the predicted consumption Q is calculated based on output power of the fuel cell 20 which is consumed by an air-conditioning device 70. A configuration of the air-conditioning device 70 will be described before describing such an example in detail.

Figure 9B:
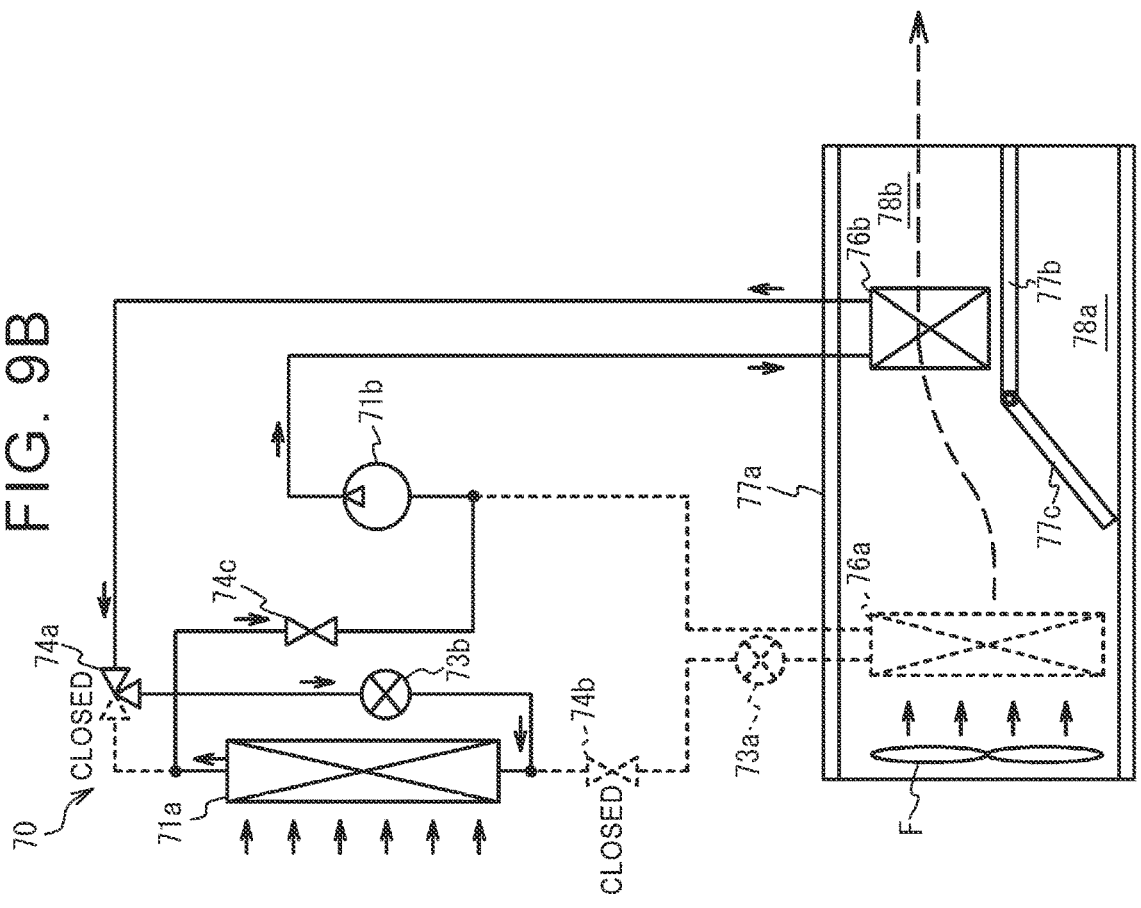
FIG. 9B is a diagram illustrating a state of the air-conditioning device at the time of heating.
Figure 9A:
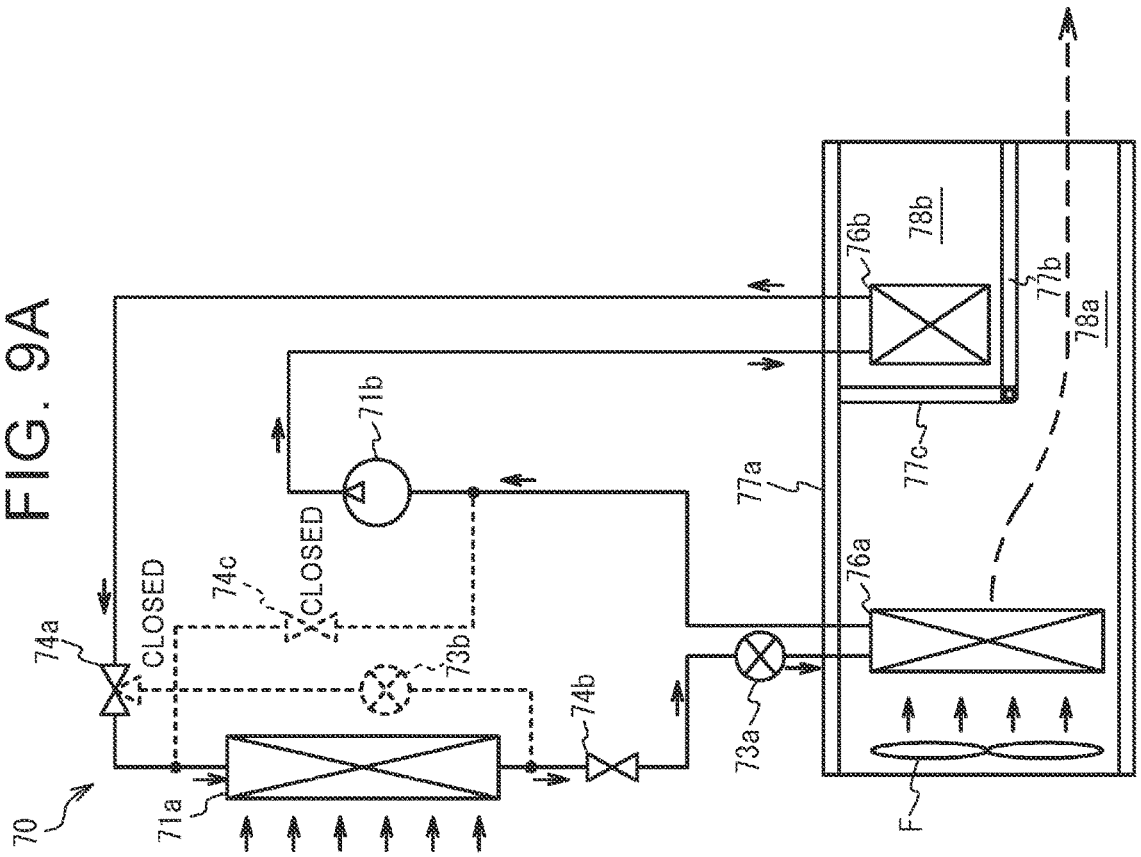
FIG. 9A is a diagram illustrating a state of an air-conditioning device at the time of cooling.

FIGS. 9A and 9B illustrate states of the air-conditioning device 70 at the time of cooling and at the time of heating. The air-conditioning device 70 includes an air-conditioning compressor 71b, an evaporator 76a, and an indoor condenser 76b, which are connected to each other via a pipe in which a refrigerant flows. At the time of cooling, ON/OFF states of a three-way valve 74a and ON/OFF valves 74b and 74c are controlled such that a refrigerant circulates as follows. As illustrated in FIG. 9A, a refrigerant in a gas phase is condensed by the air-conditioning compressor 71b, passes through the indoor condenser 76b and the three-way valve 74a in a high-temperature and high-pressure state, is cooled into a liquid phase by heat exchange with outside air in an outdoor heat exchanger 71a, is sprayed to the evaporator 76a by an expansion valve 73a, and is vaporized. At this time, the refrigerant exchanges heat with air blown from a fan F. The heat-exchanged cold air is sent to a vehicle interior via a duct 77a communicating with the vehicle interior in a state in which a shutter 77c is separated by a partition wall 77b to open a cooling air passage 78a and to close a heating air passage 78b.

At the time of heating, the ON/OFF states of the three-way valve 74a and the ON/OFF valves 74b and 74c are controlled such that a refrigerant circulates as follows. As illustrated in FIG. 9B, a refrigerant in a gas phase is condensed by the air-conditioning compressor 71b and exchanges heat with air flown from the fan F in the indoor condenser 76b in a high-temperature and high-pressure state. The heat-exchanged warm air is sent to the vehicle interior in a state in which the shutter 77c closes the air passage 78a and opens the air passage 78b. The refrigerant liquefied by the indoor condenser 76b passes through the three-way valve 74a, is changed into a fog state by the expansion valve 73b, flows into the outdoor heat exchanger 71a, and exchanges heat with outside air at the time of being vaporized in the outdoor heat exchanger 71a. The vaporized refrigerant is condensed again by the air-conditioning compressor 71b.

Figure 10A:
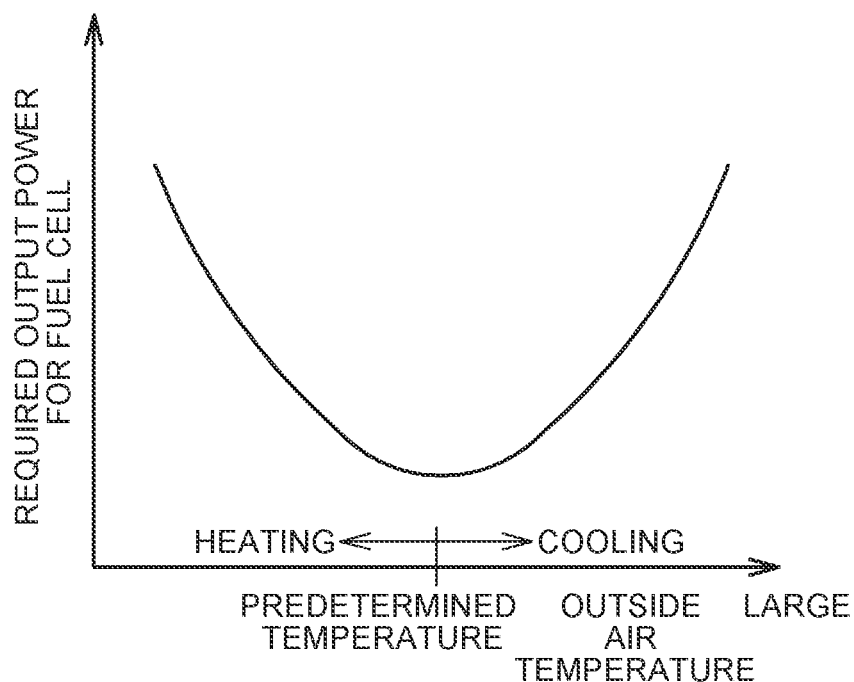
FIG. 10A is a map in which a relationship between output power required for a fuel cell by an air-conditioning device and an outside air temperature is defined.

In the third modified example, the control device 60 calculates a value, which is obtained by adding required output power required for the fuel cell 20 by the air-conditioning device 70 to the required output power for the fuel cell 20 based on the gradient and the vehicle speed illustrated in FIG. 6A, as a predicted output value P of the fuel cell 20 and the predicted consumption Q is calculated based on the predicted output value P. The required output power required for the fuel cell 20 by the air-conditioning device 70 is estimated based on an outside air temperature. FIG. 10A illustrates a map in which a relationship between the required output power required for the fuel cell 20 by the air-conditioning device 70 and the outside air temperature is defined. This map is calculated in advance by experiment and is stored in the memory 64 of the control device 60. In this map, when the temperature of the vehicle interior is held at a predetermined temperature, for example, 25° C., the required output power required for the fuel cell 20 by the air-conditioning device 70, which varies depending on the outside air temperature, is defined. As a difference between a predetermined temperature and the outside air temperature increases, it is necessary to increase a flow rate of a refrigerant carried by the air-conditioning compressor 71*b* and the power consumption of the air-conditioning compressor 71*b* also increases. Accordingly, the required output power for the fuel cell 20 also increases. The outside air temperature refers to the outside air temperature around the vehicle 1 and is acquired by the control device 60 using an outside air temperature sensor mounted in the vehicle 1. In this way, based on the output power of the fuel cell 20 which is consumed by the air-conditioning device 70 in addition to the gradient and the average vehicle speed on the route, it is possible to more accurately calculate the predicted consumption Q. The third modified example is performed only when the air-conditioning device 70 is activated, but is not performed when the air-conditioning device 70 is stopped.

Figure 10B:
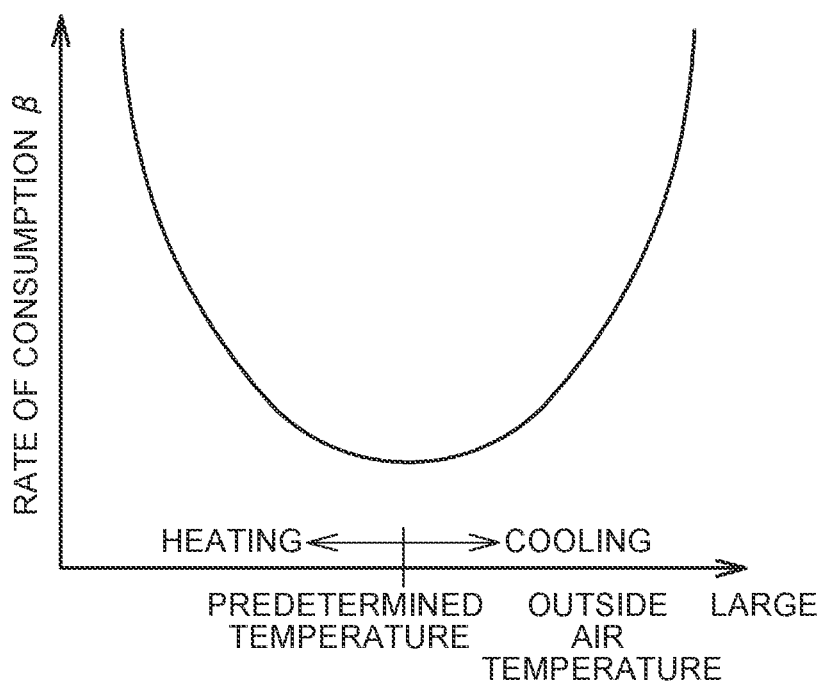
FIG. 10B is a map in which a relationship between a rate of consumption of fuel gas by an air-conditioning device and an outside air temperature is defined.

A fourth modified example will be described below. In the fourth modified example, the output power of the fuel cell 20 which is consumed by the air-conditioning device 70 is not calculated, a rate of consumption $\beta$ [g/sec] of fuel gas by the air-conditioning device 70 is calculated, and the predicted consumption Q is calculated based on the sum of the rate of consumption $\beta$ and the rate of consumption $\alpha$. FIG. 10B is a map in which a relationship between the rate of consumption $\beta$ of fuel gas by the air-conditioning device 70 and the outside air temperature is defined. This map is calculated by experiment in advance and is stored in the memory 64 of the control device 60. The predicted consumption Q may be calculated by integrating the sum of the rate of consumption $\alpha$ and the rate of consumption $\beta$ with respect to time from a current time point to a time point at which the vehicle 1 is predicted to arrive at the supply location.

In the third and fourth modified examples, the server 100 may calculate the predicted consumption Q based on the required output power required for the fuel cell 20 by the air-conditioning device 70. In this case, the map illustrated in FIG. 10A or 10B is stored in the HDD 104 of the server 100 in correlation with the identification information of the vehicle by vehicle types. The control device 60 acquires an average value of the predicted output values calculated by the server 100 with reference to the identification information of the vehicle 1 and the identification information stored in the HDD 104.

In the first to fourth modified examples, the predicted output value of the fuel cell 20 is calculated based on the gradient and the average vehicle speed and the predicted consumption Q is calculated based on the predicted output value, but may be calculated based on only the average vehicle speed. In a range in which a driver generally drives a vehicle, this is because a gradient of a road is often small or an average value of the gradient is often close to zero, and thus it is conceived that an influence of the vehicle speed predominates.

Figures 11A, 11B:
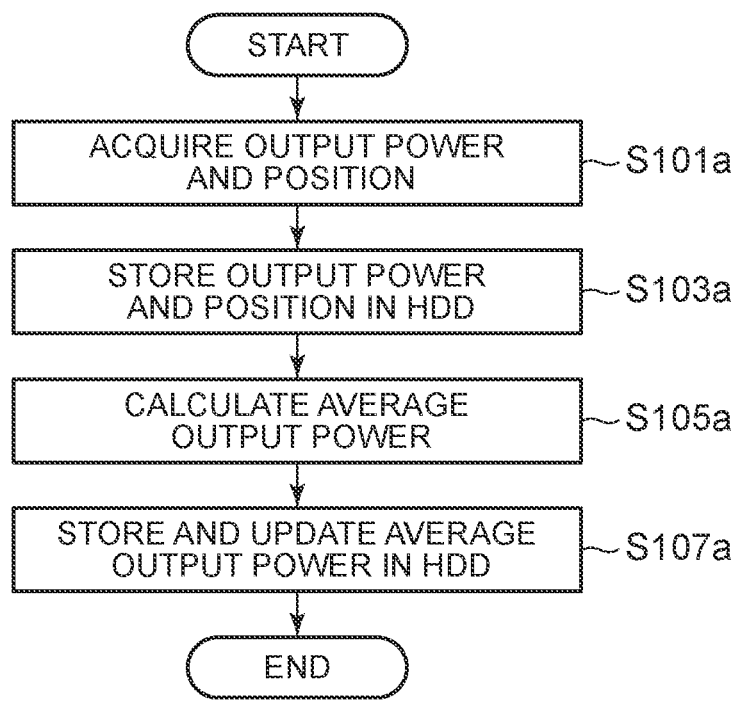
FIG. 11A is a diagram illustrating an example of average output power which is stored in an HDD of the server.
FIG. 11B is a flowchart illustrating an example of control for calculating average output power.

A fifth modified example will be described below. In the fifth modified example, the predicted consumption Q is calculated based on average output power stored in the server 100 instead of the average vehicle speed. The output power is an example of an output of a fuel cell which is a power source of a fuel-cell vehicle. First, average output power will be described. FIG. 11A is a diagram illustrating an example of average output power stored in the HDD 104 of the server 100. In the HDD 104, output power of fuel cells of a fuel-cell vehicle group which is correlated with positional information of the fuel-cell vehicle group using a fuel cell as a traveling power source and average output power of the fuel cells at each point are stored.

Control for calculating the average output power which is performed by the server 100 will be described below. FIG. 11B is a flowchart illustrating an example of the control for calculating average output power. This control is repeatedly performed at predetermined intervals. First, current locations of a plurality of fuel-cell vehicles and output power of fuel cells of the vehicles at the locations are acquired from the vehicles via the network N (Step S101*a*). Then, the acquired locations and the acquired output power are stored in the HDD 104 in correlation with each other (Step S103*a*). Then, average output power which is an average value of the output power is calculated based on the output power of the plurality of fuel cells acquired at the same point (Step S105*a*). The calculated average output power is stored and updated in the HDD 104 in correlation with the points (Step S107*a*). Accordingly, the average output power at each point reflects output power of the fuel cell 20 of the vehicle 1 and output power of the fuel cells of the other fuel-cell vehicles when the vehicle 1 has traveled through the point, and reflects output power of the fuel cells of the fuel-cell vehicles other than the vehicle 1 when the vehicle 1 has never traveled through the point.

Figure 12:
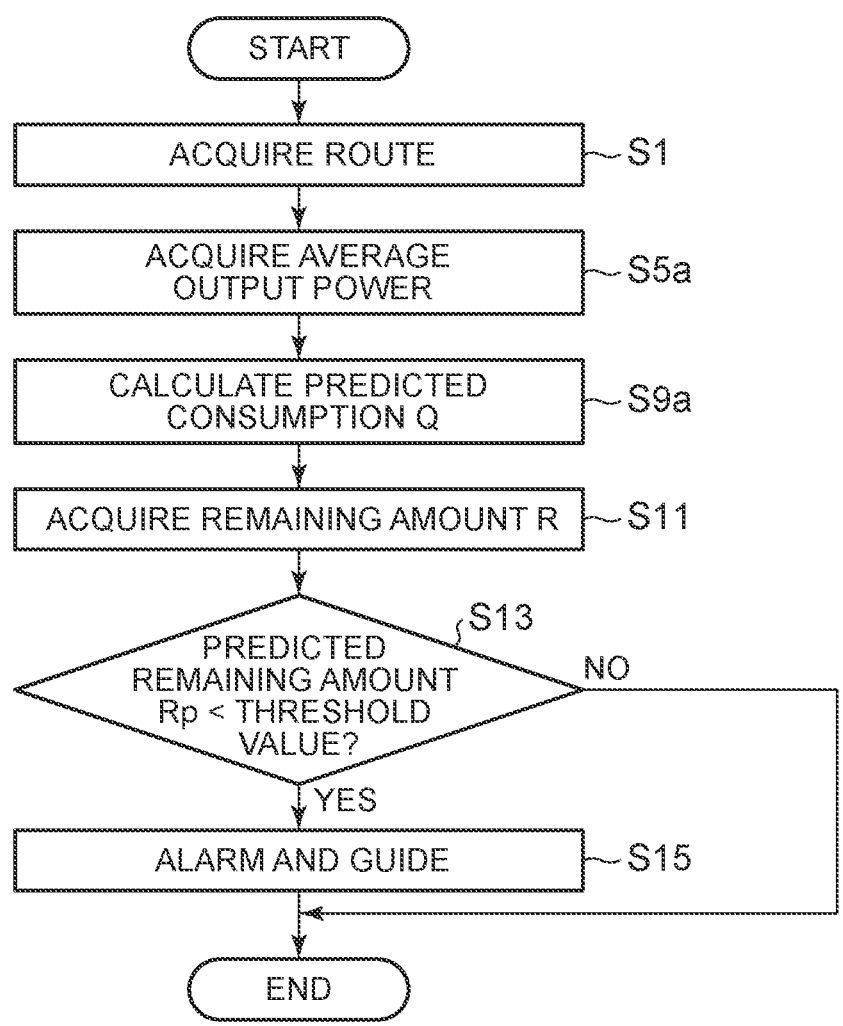
FIG. 12 is a flowchart illustrating an example of fuel consumption prediction control according to a fifth modified example.

FIG. 12 is a flowchart illustrating an example of fuel consumption prediction control according to the fifth modified example. After a route is acquired in Step S1, a gradient or an average vehicle speed is not acquired but average output power at each point on the route is acquired from the server 100 (Step S5*a*). As described above, when the vehicle 1 has traveled on the route, the output power when the vehicle 1 traveled on the route is reflected in the average output power. When the vehicle 1 has never traveled through the point, output power of other fuel-cell vehicles when the other fuel-cell vehicles traveled on the route is reflected in the average output power. Accordingly, the average output power stored in the server 100 is an example of the parameter correlated with at least one of the output power when the vehicle 1 traveled on the route and the output power of the fuel cells of other fuel-cell vehicles when the other fuel-cell vehicles traveled on the route, and the process of Step S5*a* is an example of a process which is performed by the acquisition unit that acquires the parameter.

Then, the predicted consumption Q is calculated based on the average output power at each point on the route (Step S9*a*). Specifically, since the average output power at each point on the route is regarded as output power which is predicted to be output from the fuel cell 20 at each point and the fuel consumption of the fuel cell 20 is proportional to the output power, the predicted consumption Q is calculated by multiplying the predicted output power by a predetermined coefficient and a prediction time required until the vehicle 1 arrives at the supply location from the current location. In this way, the reason for calculating the predicted consumption Q of the vehicle 1 based on the average output power of the fuel-cell vehicle group which has traveled on the route is that it can be conceived that the vehicle 1 travels on the route in conditions in which the output power of the fuel cell 20 of the vehicle 1 is close to the average output power. Accordingly, it is possible to accurately calculate the predicted consumption Q. Since the predicted consumption Q is easily calculated based on the average output power stored in the server 100, it is possible to reduce a processing load of the control device 60. By calculating the predicted consumption Q based on the latest average output power stored in the server 100, it is possible to calculate the predicted consumption Q based on newest traffic conditions and the like.

The predicted consumption Q may be calculated based on average output power of a fuel-cell vehicle group having the same vehicle type or model number as the vehicle 1 among output power stored in the server 100. Accordingly, it is possible to more accurately calculate the predicted consumption Q. In this case, the server 100 calculates the average output power for each vehicle type or each model number based on the identification information of the vehicles and the output power of the fuel cells at each point which are transmitted from the fuel-cell vehicle group, and stores the calculated average output power in the HDD 104. The control device 60 acquires the average output power of the fuel cells having the same vehicle type or model number as the vehicle 1 with reference to the identification information of the vehicle 1 and the identification information stored in the HDD 104.

The predicted consumption Q may be calculated by correcting the average output power stored in the server 100 depending on the vehicle type of the vehicle 1. For example, when the vehicle 1 is a large-sized vehicle, the predicted consumption Q may be calculated based on a value which has been corrected to increase the average output power stored in the server 100. Accordingly, it is possible to accurately calculate the predicted consumption Q. In this case, the control device 60 may perform the correction or the server 100 may perform the correction.

In the fifth modified example, the control may be performed as follows similarly to the above-mentioned embodiment. The average output power acquired from the server 100 may be average output power of a partial vehicle group into which all fuel-cell vehicles are classified based on a predetermined criterion. The previous average output power stored in the server 100 may be used. The predicted consumption Q may be calculated based on the average output power stored in the server 100, or the predicted consumption Q may be calculated based on a value obtained by correcting the average output power stored in the server 100, for example, based on a difference between the actual output power of the fuel cell 20 of the vehicle 1 in a predetermined traveling section and the average output power stored in the server 100. The predicted consumption Q may be calculated based on a value which is calculated by correcting the average output power depending on output performance deterioration of the fuel cell 20. In the fifth modified example, the control device 60 and the server 100 may perform the fuel consumption prediction control in cooperation with each other.

Without being limited to the average output power, the predicted consumption Q may be calculated based on the output power of the fuel cell 20 when the vehicle 1 actually traveled on the route, which is stored in the server 100. Accordingly, it is possible to accurately calculate the predicted consumption Q. In this case, the server 100 stores identification information and positions of the vehicles and output power of fuel cells of the vehicles in the HDD 104 from time to time. The control device 60 acquires the output power of the fuel cell 20 when the vehicle 1 traveled on the route from the HDD 104 with reference to the identification information of the vehicle 1 and the identification information stored in the HDD 104 and calculates the predicted consumption Q. When the vehicle 1 has traveled on the route a plurality of times, the latest output power of the fuel cell 20 may be used.

When the average output power at a certain point on the route which is stored in the server 100 is based on only output power of a fuel cell of a single vehicle, the predicted consumption Q of the vehicle 1 is calculated based on the output power of the fuel cell of the single vehicle. In this case, the output power stored in the server 100 may be output power of the fuel cell 20 when the vehicle 1 traveled on the route on the route or may be output power of a fuel cell when the different vehicle traveled on the route.

In the fifth modified example, the predicted consumption Q may be calculated in same way as in the third modified example. For example, when the average output power acquired by the control device 60 is data which has been calculated, for example, at a certain past time in one hour from the current time point, the outside air temperature at the current time point can be regarded to be substantially the same as the outside air temperature at the time point at which the average output power is calculated. Accordingly, since the required output power required by the air-conditioning device 70 at the current time point is substantially the same as the required output power required by the air-conditioning device 70 when the average output power was calculated. Accordingly, the predicted consumption Q may be calculated without correcting the acquired average output power. On the other hand, when the average output power acquired by the control device 60 is data which has been updated, for example, in the past in several hours from the current time point, there is a likelihood that the outside air temperature at the current time point will be different from the outside air temperature at the time point at which the average output power was calculated and the required output power required by the air-conditioning device 70 will be different from the required output power at the current time point and at the time point at which the average output power was calculated. In this case, the predicted consumption Q may be calculated by calculating the required output power required by the air-conditioning device 70 from the outside air temperature at the time at which the average output power was calculated and the current outside air temperature using the map illustrated in FIG. 10A and adding or subtracting the difference therebetween to or from the average output power.

Figures 13A, 13B:
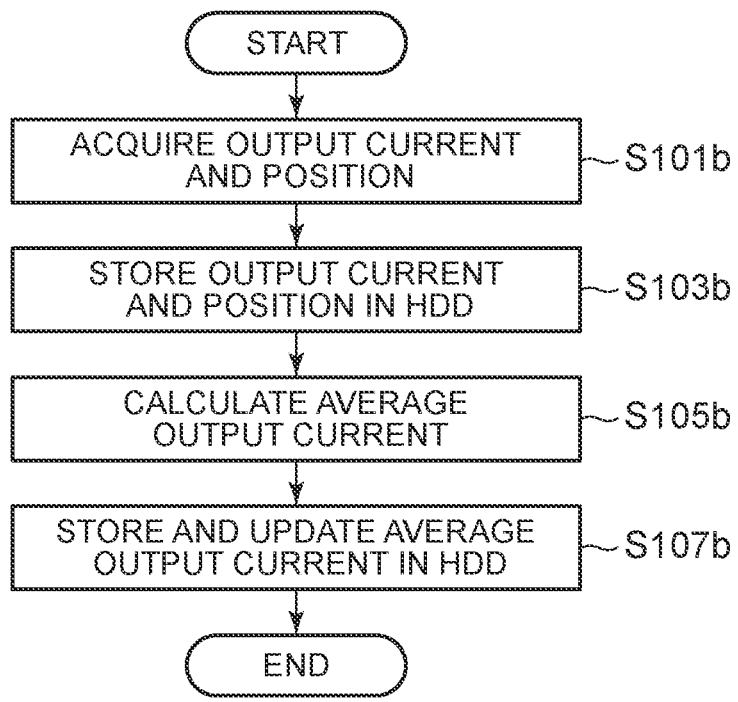
FIG. 13A is a diagram illustrating an example of an average output current which is stored in the HDD of the server.
FIG. 13B is a flowchart illustrating an example of control for calculating an average output current.

A sixth modified example will be described below. In the sixth modified example, the predicted consumption Q is calculated based on an average output current stored in the server 100 instead of the average vehicle speed. An output current is an example of an output of a fuel cell which is a power source of a fuel-cell vehicle. First, an average output current will be described. FIG. 13A is a diagram illustrating an example of an average output current stored in the HDD 104 of the server 100. In the HDD 104, output currents of fuel cells which are correlated with positional information of a fuel-cell vehicle group using a fuel cell as a power source and an average output current of the fuel cells at each point are stored.

Control for calculating an average output current which is performed by the server 100 will be described below. FIG. 13B is a flowchart illustrating an example of the control for calculating an average output current. This control is repeatedly performed at predetermined intervals. First, current locations of a plurality of fuel-cell vehicles and output currents of fuel cells of the vehicles at the locations are acquired from the fuel-cell vehicle group via the network N (Step S101*b*). Then, the acquired locations and the acquired output currents are stored in the HDD 104 in correlation with each other (Step S103*b*). Then, an average output current which is an average value of the output currents is calculated based on the output currents of the plurality of fuel cells acquired at the same point (Step S105*b*). The calculated average output current is stored and updated in the HDD 104 in correlation with the point (Step S107*b*). Accordingly, the average output current at each point reflects the output current of the fuel cell 20 of the vehicle 1 and the output currents of the fuel cells of other fuel-cell vehicles when the vehicle 1 has traveled through the point, and reflects the output currents of the fuel cells of the fuel-cell vehicles when the vehicle 1 has never traveled through the point.

Figure 14:
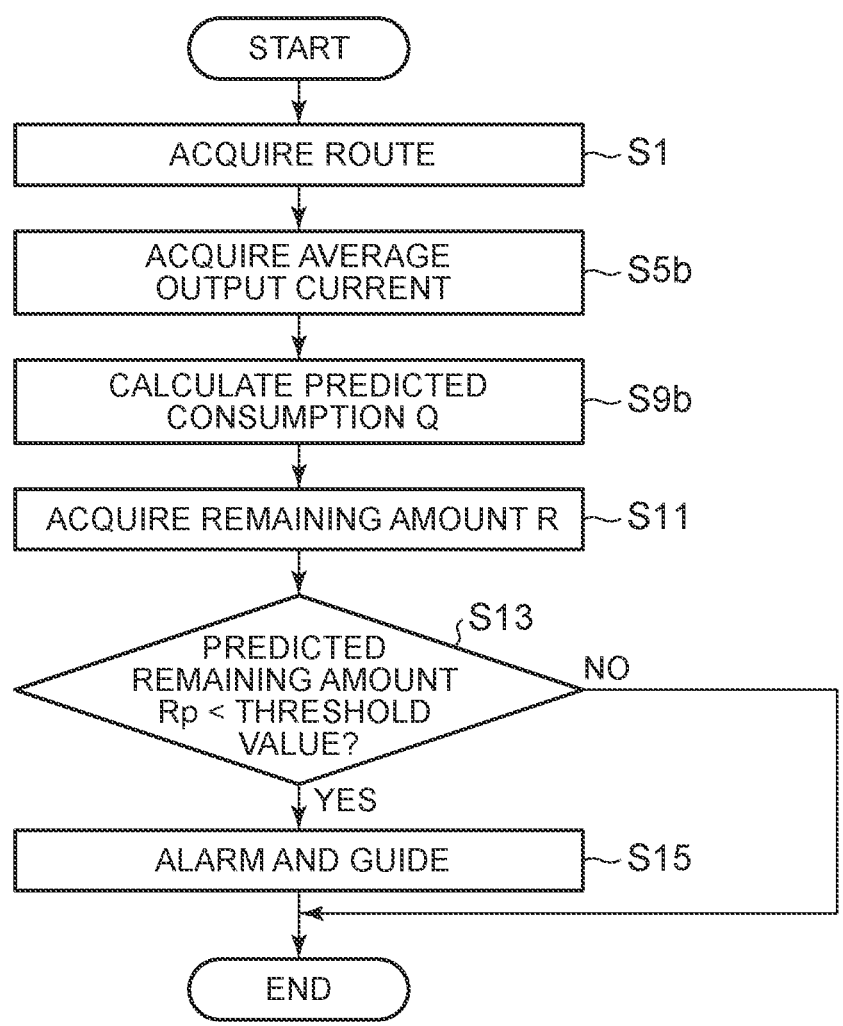
FIG. 14 is a flowchart illustrating an example of fuel consumption prediction control according to a sixth modified example.

FIG. 14 is a flowchart illustrating an example of fuel consumption prediction control according to the sixth modified example. After a route is acquired in Step S1, a gradient or an average vehicle speed is not acquired but the average output current at each point on the route is acquired from the server 100 (Step S5b). As described above, when the vehicle 1 has traveled on the route, the output current when the vehicle 1 traveled on the route is reflected in the average output current. When the vehicle 1 has never traveled through the point, the output currents of other fuel-cell vehicles when the other fuel-cell vehicles traveled on the route is reflected in the average output current. Accordingly, the average output current stored in the server 100 is an example of the parameter correlated with at least one of the output current when the vehicle 1 traveled on the route and the output currents of the fuel cells of other fuel-cell vehicles when the other fuel-cell vehicles traveled on the route, and the process of Step S5b is an example of a process which is performed by the acquisition unit that acquires the parameter.

Then, the predicted consumption Q is calculated based on the average output current at each point on the route (Step S9b). Specifically, since the average output current at each point on the route is regarded as an output current which is predicted to be output from the fuel cell 20 at each point and the fuel consumption of the fuel cell 20 is proportional to the output current, the predicted consumption Q is calculated by multiplying the predicted output current by a predetermined coefficient and a prediction time required until the vehicle 1 arrives at the supply location from the current location. In this way, the reason for calculating the predicted consumption Q of the vehicle 1 based on the average output current of the fuel-cell vehicle group which has traveled on the route is that it can be conceived that the vehicle 1 travels on the route in conditions in which the output current of the fuel cell 20 of the vehicle 1 is close to the average output current. Accordingly, it is possible to accurately calculate the predicted consumption Q. Since the predicted consumption Q can be easily calculated based on the average output current, it is possible to reduce a processing load of the control device 60. By calculating the predicted consumption Q based on the latest average output current stored in the server 100, it is possible to calculate the predicted consumption Q based on newest traffic conditions and the like.

In the sixth modified example, similarly to the fifth modified example, the predicted consumption Q may be calculated based on the average output current of a fuel-cell vehicle group having the same vehicle type or model number as the vehicle 1 among the output currents stored in the server 100. The predicted consumption Q may be calculated by correcting the average output current stored in the server 100 depending on the vehicle type of the vehicle 1.

In the sixth modified example, the control may be performed as follows similarly to the above-mentioned embodiment. The average output current acquired from the server 100 may be an average output current of a partial vehicle group into which all fuel-cell vehicles are classified based on a predetermined criterion. The previous average output current stored in the server 100 may be used. The predicted consumption Q may be calculated based on a value obtained by correcting the average output current stored in the server 100, for example, based on an output current difference between the actual output current of the fuel cell 20 of the vehicle 1 in a predetermined traveling section and the average output current stored in the server 100. The predicted consumption Q may be calculated based on a value which is calculated by correcting the average output current depending on output performance deterioration of the fuel cell 20. In the sixth modified example, the control device 60 and the server 100 may perform the fuel consumption prediction control in cooperation with each other.

Without being limited to the average output current, the predicted consumption Q may be calculated based on the output current of the fuel cell 20 when the vehicle 1 actually traveled on the route, which is stored in the server 100. In this case, the server 100 stores identification information and positions of the vehicles and output currents of fuel cells of the vehicles in the HDD 104 from time to time. The control device 60 acquires the output current of the fuel cell 20 when the vehicle 1 traveled on the route from the HDD 104 with reference to the identification information of the vehicle 1 and the identification information stored in the HDD 104 and calculates the predicted consumption Q. In this case, the latest output current of the fuel cell 20 may be used.

When the average output current at a certain point on the route which is stored in the server 100 is based on only an output current of a fuel cell of a single vehicle, the predicted consumption Q of the vehicle 1 is calculated based on the output current of the fuel cell of the single vehicle. In this case, the output current stored in the server 100 may be an output current of the fuel cell 20 when the vehicle 1 traveled on the route or may be an output current of a fuel cell when the different vehicle traveled on the route.

In the sixth modified example, the predicted consumption Q may be calculated in the same way as in the third modified example. For example, a sum of the predicted consumption calculated based on the average output current and the predicted consumption which is consumed by the air-conditioning device 70 based on the required output power calculated based on the map illustrated in FIG. 10A may be calculated as a final predicted consumption Q.

In the above-mentioned embodiment and the plurality of modified examples, the disclosure is applied to the vehicle 1 which is a fuel-cell vehicle, but the disclosure may be applied to an electric vehicle in which a fuel cell or an engine is not mounted and which uses only a secondary battery as a power source and uses a motor as a drive source. In this case, since the secondary battery can be supplied with electric power as an energy source from the outside of the vehicle and can store the electric power, electric power is an example of an energy source which is supplied and stored from the outside of the vehicle and the secondary battery is an example of a power source that consumes the stored electric power. Accordingly, the electric vehicle is an example of a vehicle that travels using only the secondary battery that consumes the electric power supplied and stored from the outside of the vehicle. In this case, a supply location is a point at which the secondary battery can be supplied with electric power, that is, a point at which a charging station that can charge the secondary battery is located.

When the above-mentioned embodiment and the plurality of modified examples are applied to an electric vehicle, the following configuration is specifically employed. In the above-mentioned embodiment, a predicted output value of the secondary battery at each point is calculated with reference to a map in which a required output power for the secondary battery is defined with reference to an average vehicle speed and a gradient on a route, and a predicted consumption of electric power from a current location to a supply location is calculated with reference to a map in which a rate of consumption of electric power of the secondary battery is defined with respect to the predicted output value. In the first modified example, a total predicted output value of the secondary battery is calculated based on the calculated predicted output value, and the predicted consumption is calculated with reference to a map in which the predicted consumption of electric power of the secondary battery is defined with respect to the total predicted output value. In the second modified example, an average predicted output value of the secondary battery is calculated based on the calculated predicted output value, and a rate of consumption of electric power is calculated to calculate the predicted consumption with reference to a map in which the rate of consumption of electric power corresponding to the average predicted output value is defined. In the third modified example, the predicted consumption of electric power is calculated with reference to a map in which a relationship between required output power required for the secondary battery by the air-conditioning device and an outside air temperature is defined. In the fourth modified example, the predicted consumption of electric power is calculated with reference to a map in which a relationship between a rate of consumption of electric power of the secondary battery by the air-conditioning device and an outside air temperature is defined. In the fifth modified example, the server 100 stores output power of secondary batteries along with positional information of an electric vehicle group and calculates and stores average output power at each point, and a control device of an electric vehicle acquires the average output power from the server 100 and calculates the predicted consumption of electric power. In the sixth modified example, the server 100 stores output currents of secondary batteries along with positional information of an electric vehicle group and calculates and stores an average output current at each point, and a control device of an electric vehicle acquires the average output current from the server 100 and calculates the predicted consumption of electric power.

In the above-mentioned embodiment and the plurality of modified examples, predicted consumption Q on a route from a current location to a supply location is calculated, but the route is not limited thereto as long as it is a route from a first point to a second point on which the vehicle 1 can travel. For example, the first point is a current location of the vehicle 1 and the second point is a destination or a transit point which is set in the navigation device 90. In this case, for example, depending on a predicted remaining amount Rp, a message indicating that an amount of fuel gas remaining R is sufficient, a message that attracts attention, or a message for alarm may be displayed on a display or the like, or the predicted consumption Q or the predicted remaining amount Rp may be displayed thereon. The first point may be, for example, a departure place which is set to a point other than the current location set in the navigation device 90. In this case, for example, a predicted consumption Q from the departure place to the destination along with a route may be displayed on the display. Accordingly, it is possible to provide a plan of a scheduled driving route or determination materials for change to a driver.

In the above-mentioned embodiment and a plurality of modified examples thereof, various values are calculated using maps, but may be calculated using calculation expressions.

While exemplary embodiments of the present disclosure have been described above in detail, the present disclosure is not limited to a specific embodiment, but can be modified in various forms without departing from the gist of the present disclosure described in the appended claims.

What is claimed is:

1. An energy consumption predicting device comprising a processor in data communication with a server, the processor being configured to:
   acquire an average vehicle speed of a part of first vehicles, at a point on a route from a first point to a second point, and a gradient at the point, each of the first vehicles being a vehicle that has traveled on the route, the part of the first vehicles being classified as a group satisfying a specific criteria and corresponding to a second vehicle of which a predicted consumption of the fuel gas is to be calculated, the first point being a current position of the first vehicle, the second point being a fuel supply location;
   calculate a predicted consumption of the fuel gas of the second vehicle based on the average vehicle speed and the gradient, the second vehicle using only a second fuel cell consuming the fuel gas;
   calculate a predicted remaining amount of the fuel gas of the second vehicle based on the predicted consumption of the fuel gas and an remaining amount of the fuel gas;
   determine whether the predicted remaining amount of the fuel gas is less than a threshold value; and
   output an alarm message for prompting an occupant of the second vehicle to supply the fuel gas and route information on the route to a fuel supply location when the predicted remaining amount is less than the threshold value.

2. The energy consumption predicting device according to claim 1, wherein the processor is further configured to:
   acquire a parameter correlated with a total predicted output value of a first output power of a first fuel cell each output by at least one of the first vehicles while the at least one of the first vehicles were traveling between the first point and the second point using only the first fuel cell consuming a fuel gas; and
   calculate the predicted consumption of the fuel gas of the second vehicle based on the parameter,
   wherein the parameter is correlated with a most recent output of the first fuel cell, and
   the parameter is correlated with the most recent output of the first fuel cell and a most recent output of the second fuel cell when the processor is configured to acquire the parameter further correlated with a total predicted output value of a second output power of the second fuel cell output by the second vehicle while the second vehicle was traveling between the first point and the second point.

3. The energy consumption predicting device according to claim 1, wherein the server is disposed outside the vehicles and the server is in data communication with the processor by radio communication.

4. The energy consumption predicting device according to claim 1, wherein the processor calculates the predicted consumption based on the output of the first fuel cell which is consumed by an air-conditioning device of the first vehicle or consumption of the fuel gas.

5. An energy consumption predicting method performed by a processor, the energy consumption predicting method comprising:
   acquiring an average vehicle speed of a part of first vehicles, at a point on a route from a first point to a second point, and a gradient at the point, each of the first vehicles being a vehicle that has traveled on the route, the part of the first vehicles being classified as a group satisfying a specific criteria and corresponding to a second vehicle of which a predicted consumption of the fuel gas is to be calculated, the first point being a current position of the first vehicle, the second point being a fuel supply location;

calculating a predicted consumption of the fuel gas of the second vehicle based on the average vehicle speed and the gradient, the second vehicle using only a second fuel cell consuming the fuel gas;

calculating a predicted remaining amount of the fuel gas of the second vehicle based on the predicted consumption of the fuel gas and an remaining amount of the fuel gas;

determining whether the predicted remaining amount of the fuel gas is less than a threshold value; and outputting an alarm message for prompting an occupant of the second vehicle to supply the fuel gas and route information on the route to a fuel supply location when the predicted remaining amount is less than a threshold value.

* * * * *